United States Patent
Oelze et al.

(10) Patent No.: US 10,281,568 B2
(45) Date of Patent: May 7, 2019

(54) METHOD AND APPARATUS FOR NULL SUBTRACTION ULTRASOUND IMAGING

(71) Applicant: THE BOARD OF TRUSTEES OF THE UNIVERSITY OF ILLINOIS, Urbana, IL (US)

(72) Inventors: Michael L. Oelze, Champaign, IL (US); Jonathan Reeg, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 119 days.

(21) Appl. No.: 15/294,187

(22) Filed: Oct. 14, 2016

(65) Prior Publication Data

US 2017/0108584 A1    Apr. 20, 2017

Related U.S. Application Data

(60) Provisional application No. 62/408,342, filed on Oct. 14, 2016, provisional application No. 62/242,444, filed on Oct. 16, 2015.

(51) Int. Cl.
| | | |
|---|---|---|
| *G01S 7/00* | (2006.01) | |
| *G01S 7/52* | (2006.01) | |
| *G01S 15/89* | (2006.01) | |

(52) U.S. Cl.
CPC ...... *G01S 7/52047* (2013.01); *G01S 15/8915* (2013.01)

(58) Field of Classification Search
CPC ............. G01S 7/52047; G01S 7/52095; G01S 7/52053
See application file for complete search history.

(56) References Cited

U.S. PATENT DOCUMENTS

| | | |
|---|---|---|
| 5,548,561 A | 8/1996 | Hussain et al. |
| 6,258,034 B1 | 7/2001 | Hanafy et al. |
| 6,436,044 B1 | 8/2002 | Wang |

OTHER PUBLICATIONS

Guenther, et al., "Optimal apodization design for medical ultrasound using constrained least squares part I: theory", Ultrasonics, Ferroelectrics, and Frequency Control, IEEE Transactions on 54.2, 2007, 332-342 (Abstract Only).
Guenther, et al., "Optimal apodization design for medical ultrasound using constrained least squares part II: Simulation Results", Ultrasonics, Ferroelectrics, and Frequency Control, IEEE Transactions on 54.2, Feb. 2007, 343-358.
Guo, J. et al., "Method of ultrasonic phased array imaging based on segment amplitude apodization", 2013 (Abstract Only).
Savoia, A.S. et al., "Improved Lateral Resolution and Contrast in Ultrasound Imaging Using a Sidelobe Masking Technique", IEEE International Ultrasonics Symposium, 2014, 1682-1685.

(Continued)

*Primary Examiner* — Hovhannes Baghdasaryan
(74) *Attorney, Agent, or Firm* — Guntin & Gust, PLC; Ralph Trementozzi

(57) ABSTRACT

Aspects of the subject disclosure may include, for example, applying different apodization weights for ultrasound echoes to generate a plurality of images of a target where one of the apodization weights has a zero mean value across an aperture of a transducer array and generating a null subtracted image of the target by combining the plurality of images. Other embodiments are disclosed.

20 Claims, 24 Drawing Sheets

(56) References Cited

OTHER PUBLICATIONS

Guenther, et al., "Optimal apodization design for medical ultrasound using constrained least squares part I: theory", Ultrasonics, Ferroelectrics, and Frequency Control, IEEE Transactions on 54.2, 2007, 332-342.

Guo, J. et al., "Method of ultrasonic phased array imaging based on segment amplitude apodization", IEEE, 181-188, 2013.

Dolph, C.L. , ""A Current Distribution for Broadside Arrays Which Optimizes the Relationship between Beam Width and Side-Lobe Level,"", Proc. IRE, vol. 34, No. 6, 1946.

Harris, F.J. , "On the use of windows for harmonic analysis with the discrete Fourier transform,", Proc. IEEE, vol. 66, No. 1, pp. 51-83, 1978.

He, et al., ""A isidelobe suppressing near-field beamforming approach for ultrasound array imaging,"", J. Acoust Soc Amer, 135: 2785-2790, 2015.

Holfort, J.K. et al., ""Broadband Minimum Variance Beamforming for Ultrasound Imaging,"", IEEE Trans. Ultrason. Ferroelectr. Freq. Control, vol. 56, No. 2, pp. 314-325, 2009.

Jensen, J.A. et al., ""Calculation of pressure fields from arbitrarily shaped, apodized, and excited ultrasound transducers,"", IEEE Trans. Ultrason. Ferroelec. Freq. Control, 39, 262-267, 1992.

Jensen, J.A. , ""Field: A program for simulating ultrasound systems,"", in Medical & Biological Engineering & Computing, 34, 351-353, 1996.

Machado, P. et al., ""New image processing technique for evaluating breast microcalcifications: a comparative study,"", J Ultrasound Med, vol. 31, No. 6, pp. 885-893, 2012.

Seo, C.H. et al., ""Sidelobe suppression in ultrasound imaging using dual apodization with cross-correlation,"", IEEE Trans. Ultrason., Ferroelect., Freq. Control, vol. 55, No. 10, pp. 2198-2210, 2008.

Sung, J. et al., ""Dual-/tri-apodization techniques for high frequency ultrasound imaging: a simulation study,"", BioMedical Eng Online, vol. 13, No. 1, p. 143, [Online]. Available: http://www.biomedical-engineering-online.com/content/13/1/143, 2014.

Synnevag, J.F. et al., ""Speckle statistics in adaptive beamforming,"", Proc. 2007 IEEE Ultrasonics Symp., 1545-1548, 2007.

Taylor, T.T. , ""Design of line-source antennas for narrow beamwidth and low side lobes,"", IRE Trans. Antennas Propag., vol. 3, No. 1, 1955.

T'Hoen, , ""Aperture apodization to reduce the off-axis intensity of the pulsed-mode directivity function of linear arrays,"", Ultrasonics, vol. 20, No. 5, pp. 231-236, 1982.

COMPARISON OF POINT TARGETS

| Apodization | Rect | Square Mask | Square Bridge | DPSS Bridge |
|---|---|---|---|---|
| Beamwidth (mm) | 0.60 | 0.28 | 0.09 | 0.10 |
| MSR (dB) | -19 | -10 | -44 | -48 |

COMPARISON OF POINT TARGETS AT SUCCESSIVE DEPTHS

| | -3-dB Beamwidth (mm) | | MSR (dB) | |
|---|---|---|---|---|
| Wire Target Depth (cm) | Rect | DPSS Bridge | Rect | DPSS Bridge |
| 1 | 0.37 | 0.07 | -16 | -44 |
| 2 | 0.60 | 0.10 | -19 | -48 |
| 3 | 0.84 | 0.16 | -19 | -48 |
| 4 | 1.14 | 0.19 | -19 | -49 |

Comparison of Wire Targets at Successive Depths

| Depth (cm) | Apodization | | | | | |
|---|---|---|---|---|---|---|
| | Rect (32 elements) | Rect Bridge (32 ele) | DPSS Bridge (32 ele) | Rect (64 ele) | Rect Bridge (64 ele) | DPSS Bridge (64 ele) |
| 1 | 0.37 | 0.06 | 0.06 | 0.54 | 0.06 | 0.09 |
| 2 | 0.65 | 0.12 | 0.12 | 0.61 | 0.06 | 0.09 |
| 3 | 0.97 | 0.21 | 0.21 | 0.80 | 0.10 | 0.13 |
| 4 | 1.48 | 0.29 | 0.29 | 1.10 | 0.13 | 0.14 |

(a) Beamwidth (mm)

| Depth (cm) | Apodization | | | | | |
|---|---|---|---|---|---|---|
| | Rect (32 elements) | Rect Bridge (32 ele) | DPSS Bridge (32 ele) | Rect (64 ele) | Rect Bridge (64 ele) | DPSS Bridge (64 ele) |
| 1 | 1.25 | 0.18 | 0.19 | 1.81 | 0.19 | 0.30 |
| 2 | 2.20 | 0.40 | 0.40 | 2.06 | 0.22 | 0.29 |
| 3 | 3.29 | 0.68 | 0.70 | 2.71 | 0.34 | 0.43 |
| 4 | 5.01 | 0.98 | 0.98 | 3.70 | 0.45 | 0.46 |

(b) Beamwidth ($\lambda$)

| Depth (cm) | Apodization | | | | | |
|---|---|---|---|---|---|---|
| | Rect (32 elements) | Rect Bridge (32 ele) | DPSS Bridge (32 ele) | Rect (64 ele) | Rect Bridge (64 ele) | DPSS Bridge (64 ele) |
| 1 | -20 | -30 | -29 | -17 | -33 | -27 |
| 2 | -15 | -26 | -29 | -21 | -37 | -26 |
| 3 | -16 | -25 | -25 | -18 | -32 | -29 |
| 4 | -13 | -26 | -30 | -17 | -29 | -27 |

(c) MSR (dB)

COMPARISON OF WIRE TARGETS AT SUCCESSIVE DEPTHS

| Depth (cm) | Apodization | | | |
|---|---|---|---|---|
| | Rect | Rect Bridge (c = 0.05) | Rect Bridge (c = 0.1) | Compounded (c = 0.05) |
| 1 | 0.88 | 0.02 | 0.04 | 0.05 |
| 2 | 0.76 | 0.03 | 0.06 | 0.07 |
| 3 | 1.06 | 0.11 | 0.15 | 0.20 |

(a) Beamwidth (mm)

| Depth (cm) | Apodization | | | |
|---|---|---|---|---|
| | Rect | Rect Bridge (c = 0.05) | Rect Bridge (c = 0.1) | Compounded (c = 0.05) |
| 1 | 2.86 | 0.06 | 0.13 | 0.16 |
| 2 | 2.47 | 0.10 | 0.19 | 0.23 |
| 3 | 3.44 | 0.36 | 0.49 | 0.65 |

(b) Beamwidth ($\lambda$)

| Depth (cm) | Apodization | | |
|---|---|---|---|
| | Rect | Rect Bridge (c = 0.05) | Rect Bridge (c = 0.1) |
| 1.9 | -19 | -48 | -42 |

(c) MSR (dB)

FIG. 12D

COMPARISON OF CNR IN CONTRAST TARGETS

| Target | Apodization | | |
|---|---|---|---|
| | Rect | Rect Bridge | Compounded |
| Anechoic | -0.83 | -0.42 | -0.82 |
| Hyperechoic | 0.74 | 0.27 | 0.72 |

FIG. 12E

COMPARISON OF SNR OF
PRE-BEAMFORMED DATA VERSUS POST BEAMFORMING

| SNR (dB) Pre-Beamformed | Apodization | |
|---|---|---|
| | SNR (dB) Rect | SNR (dB) Rect Bridge |
| 35 | 44 | 51 |
| 10 | 21 | 37 |

FIG. 12R

METHOD AND APPARATUS FOR NULL SUBTRACTION ULTRASOUND IMAGING

CROSS-REFERENCE TO RELATED APPLICATIONS

This application claims priority to U.S. Provisional Application No. 62/242,444 filed Oct. 16, 2015 and U.S. Provisional Application No. 62/408,342 filed Oct. 14, 2016, the disclosures of which are hereby incorporated by reference in their entirety.

FIELD OF THE DISCLOSURE

The subject disclosure relates to a method and apparatus for null subtraction ultrasound imaging.

BACKGROUND

Ultrasound imaging utilizes sound waves with frequencies that are higher than those audible to humans. The ultrasonic images are made by sending pulses of ultrasound into a target (e.g., human tissue) using a probe. The sound echoes off the target with different portions of the target reflecting varying degrees of sound. These echoes are recorded and displayed as an image.

Image distortion can hamper the information intended to be provided by the ultrasound image. Shaping of radiation patterns can be used to try to avoid image distortion.

BRIEF DESCRIPTION OF THE DRAWINGS

Reference will now be made to the accompanying drawings, which are not necessarily drawn to scale, and wherein:

FIG. 6 illustrates a comparison of point targets.

FIG. 7 illustrates a comparison of point targets at successive depths.

FIG. 11 depicts a comparison of wire targets at different depths.

FIG. 12D illustrates a comparison of wire targets at successive depths.

FIG. 12E illustrates a comparison of CNR in contrast targets.

FIGS. 12O-12Q depict images of cross sections of the ATS539 phantom's 1 cm depth wire target with white Gaussian noise included prior to beamforming.

FIG. 12R illustrates a comparison of SNR of pre-beamformed data versus post beamforming.

DETAILED DESCRIPTION

The subject disclosure describes, among other things, illustrative embodiments for generating ultrasound images that employ null-subtraction apodization schemes. Other embodiments are described in the subject disclosure.

One or more aspects of the subject disclosure are a method including emitting, by a system including a processor, ultrasonic waves from a transducer array directed to a target. The system can receive, at the transducer array, ultrasound echoes. The system can apply a first apodization weight for the ultrasound echoes to generate a first image, where the first apodization weight has a zero mean value across a subaperture of the transducer array. The system can apply a second apodization weight for the ultrasound echoes to generate a second image, where the second apodization weight has a non-zero mean value across the subaperture of the transducer array. The system can generate a third image based on a transposed second image that is generated by transposing the second apodization weight. The system can combine the first, second and third images to generate a null subtracted image of the target.

One or more aspects of the subject disclosure include a device having a processor and a memory that stores executable instructions that, when executed by the processor, facilitate performance of operations. The processor can apply a first apodization weight for ultrasound echoes to generate a first image, where the first apodization weight has a zero mean value across a subaperture of a transducer array. The processor can apply a second apodization weight for the ultrasound echoes to generate a second image, where the second apodization weight has a non-zero mean value across the subaperture of the transducer array. The processor can generate a third image based on a transposed second image that is generated by transposing the second apodization weight. The processor can combine the first, second and third images to generate a null subtracted image of a target.

One or more aspects of the subject disclosure include a machine-readable storage medium, comprising executable instructions that, when executed by a processor, facilitate performance of operations, including applying different apodization weights for ultrasound echoes to generate a plurality of images of a target, where one of the apodization weights has a zero mean value across an aperture of a transducer array. The processor can generate a null subtracted image of the target by combining the plurality of images.

Figure 1:
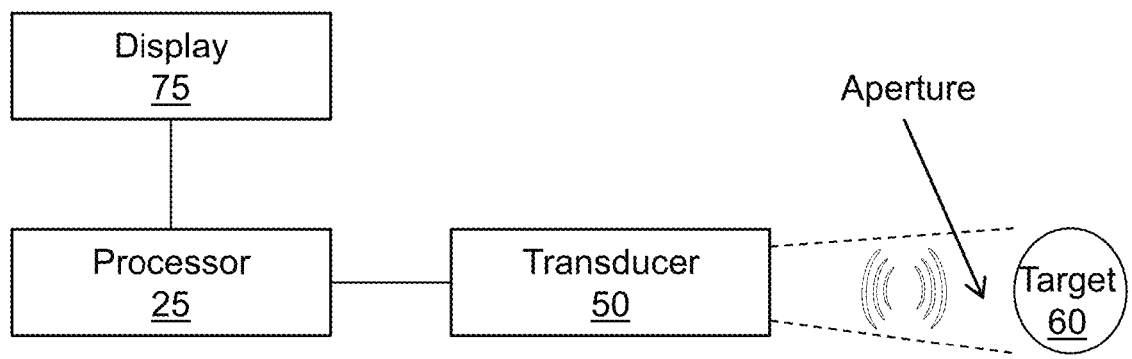
FIG. 1 depicts an illustrative embodiment of an ultrasound imaging system that generates null subtraction images.

FIG. 1 depicts an illustrative embodiment of an imaging system 100 that can provide ultrasound images of a target 60. Target 60 can be any type of object including a human body part. System 100 can reduce or eliminate image distortion caused by the presence of sidelobes from the radiation pattern of a transducer. System 100 can include various components, such as a processor 25, a transducer 50, and a display 75 that facilitate capturing ultrasound data for generating images. In one or more embodiments of system 100, backscattered echo data (e.g., received as a result of emitting plane waves from transducer 50 such as a transducer array of elements) can be captured by the transducer array. The transducer 50 can send out pulses of ultrasound and can then listen for echoes. In one or more embodiments, on transmission and/or reception, weights can be assigned (i.e., apodization) to the elements of the transducer array 50 by the processor 25 to shape the radiation pattern. The transducer array 50 can include various components that facilitate the emitting and receiving of the ultrasound signals, including piezoelectric elements.

In one embodiment, system 100 can apply an apodization technique which can lower sidelobes in exchange for increasing the width of the mainlobe and thus decreasing lateral resolution in the image. Null subtraction imaging can use different on-receive apodizations on copies of the same image to reduce or eliminate image distortion problems. For example, a first apodization weight can be applied which has a zero mean value when summed across the subaperture of the array. This places a null at the broadside of the receive pattern. A second apodization weight can be utilized which is the same as the first apodization weight except that a constant offset in weight is applied to create a non-zero mean value. A third apodization weight can be utilized which is a transpose of the second apodization weight. The images created with the different weighting schemes can then be combined or otherwise added/subtracted to form a new image with improved sidelobe performance and better lateral resolution. In one embodiment, plane waves can be emitted from the transducer array 50 and ultrasound echoes can be received by each array element. Image reconstruction can be performed utilizing a Stolt f-k migration with the apodization weighting techniques.

Figure 2A:
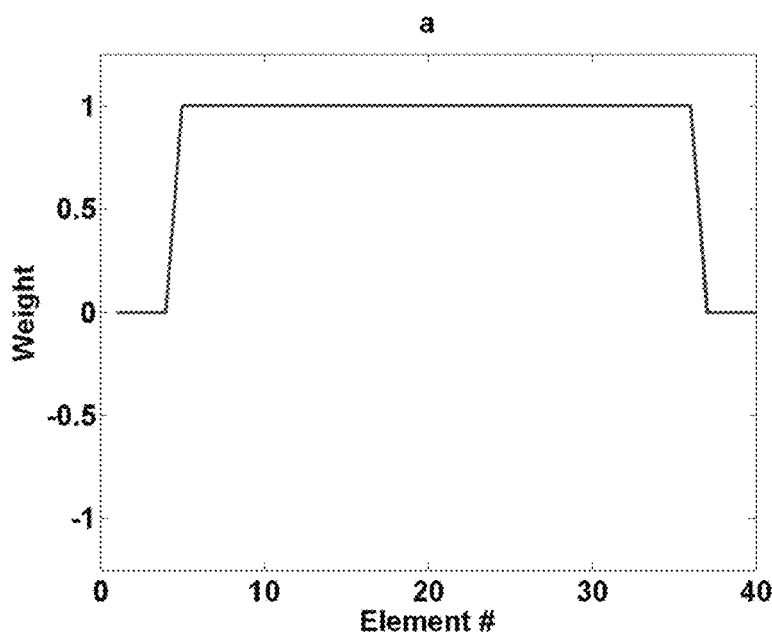
FIGS. 2A-D depict examples of apodization functions and their respective beam patterns including: (A) a first rectangular apodization function where all 32 elements are weighted equally; (B) a second apodization according to a zero-mean function where half of the elements are weighted with equal magnitude but opposite sign than the other half, referred to as the rect-bridge scheme; (C) a beam pattern of a transducer weighted with the function in (A); and (D) a beam pattern of the same transducer weighted with the function in (B). In at least some embodiments, the second apodization is equal to the first with the exception of a small DC constant added to all element weights (we present results for c=0.05 and c=0.1). The second apodization can then be transposed, or flipped, to form the third apodization.
Figure 2B:
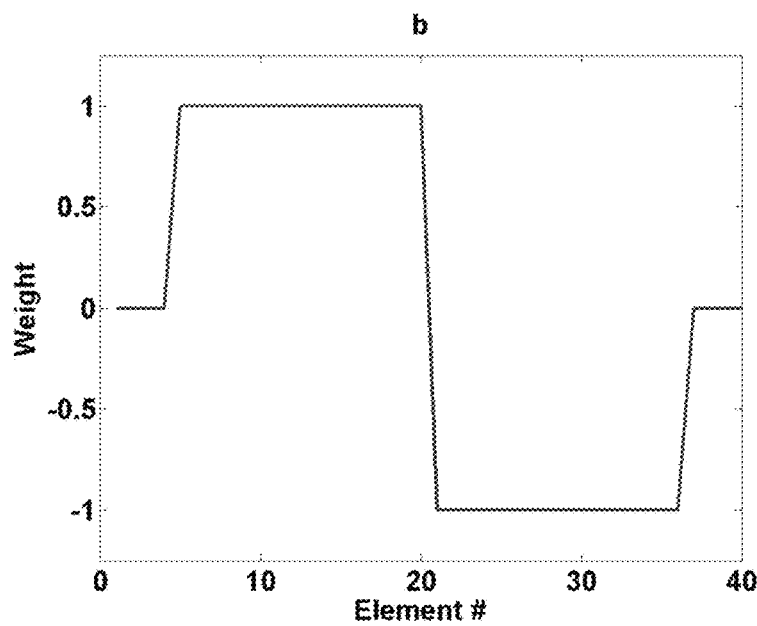
Figure 2C:
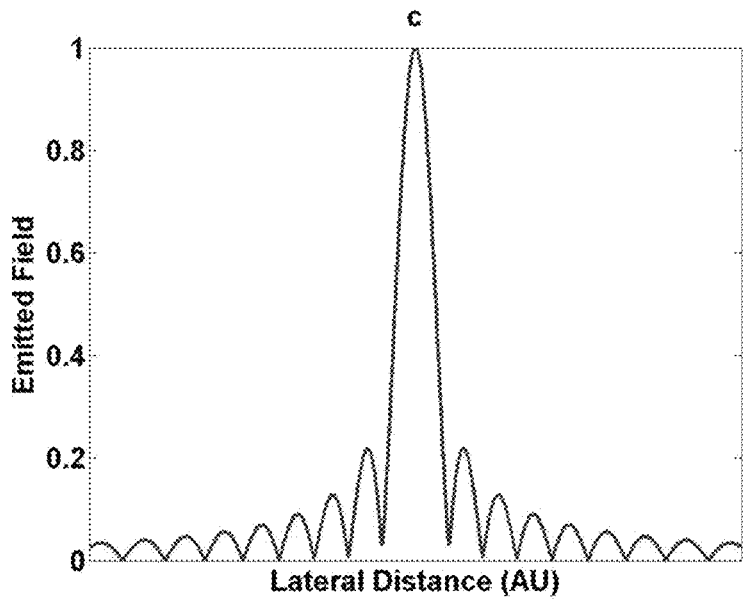
Figure 2D:
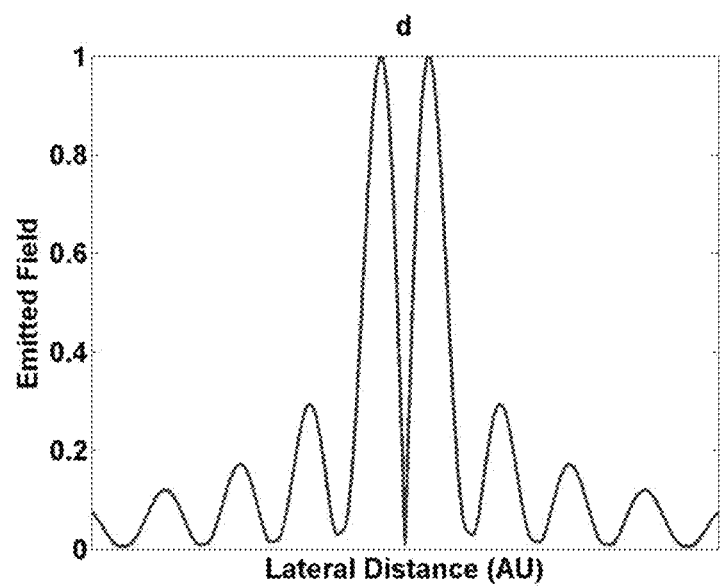
Figure 3:
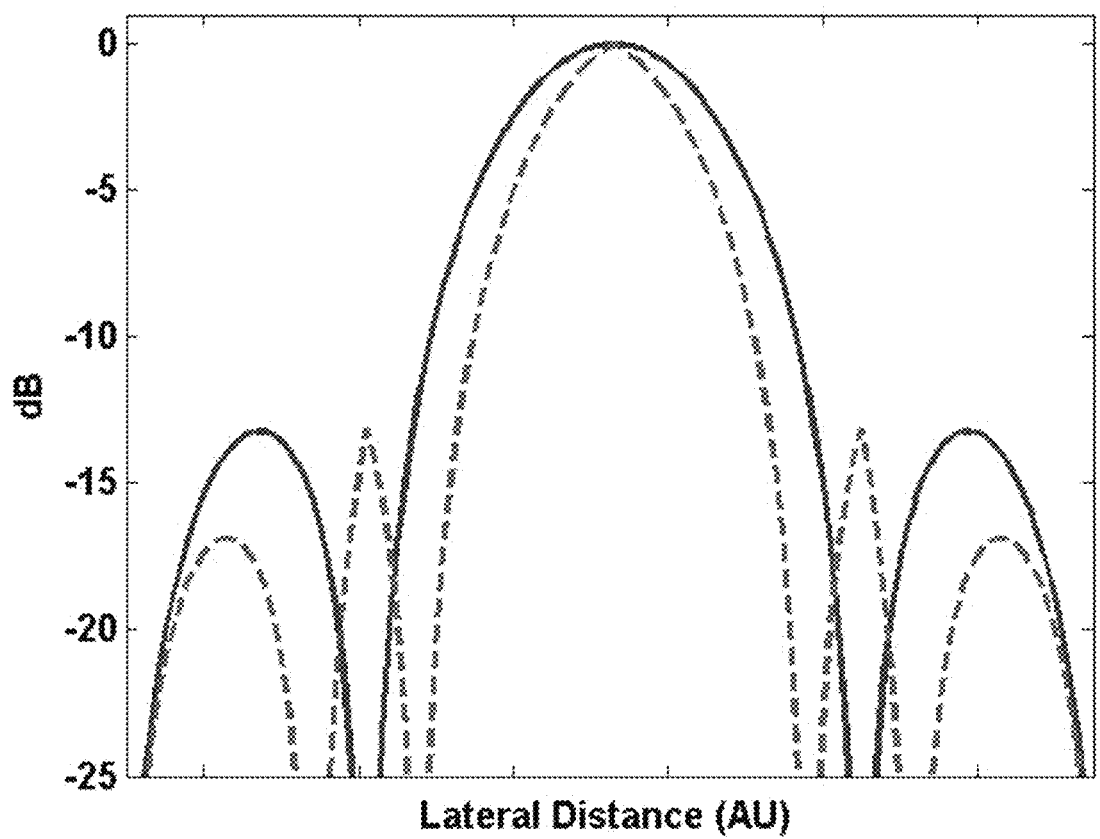
FIG. 3 depicts a beam pattern (solid line) from a rectangular apodization function, and a beam pattern (dashed line) created by subtracting the intensity field for the zero-mean apodization from the intensity field for the rectangular apodization. This is an example of masking which is distinct from the bridging technique of the exemplary embodiments.

System 100 can utilize an apodization scheme that relies on using a null in the beam pattern to achieve the desired imaging. Because the null of the beam can fall off faster than the roll-off of the mainlobe, spatial resolution can be improved over imaging with the mainlobe. The far-field beam pattern from an ultrasonic transducer or an array is related to the Fourier transform of the product of the aperture function and the apodization function. For example, the beam pattern for a rectangular function is a sinc as shown in FIGS. 2A and 2C. Based on these Fourier transform pairs, the beam pattern from an apodization function with a zero mean weighting across the array results in a null occurring at the broadside. FIGS. 2B and 2D illustrate a zero-mean apodization function and the predicted beam pattern. The beam pattern for a rectangular window (e.g., no apodization) maintains a beamwidth limited by diffraction. However, if the width of the rectangular apodization is compared with one minus the zero-mean apodization beam pattern (see FIG. 3), the shape of the main beam falls off much faster for the 'inverted' null beam. The property of the null beam is exploited by system 100 through approaches that improve the lateral resolution while maintaining low sidelobes. A bridging technique can be utilized by system 100. There are several apodization functions that can be employed or otherwise utilized with the exemplary embodiments—this can include a zero mean apodization combined with the same apodization structure with a dc component.

In the masking technique, apodization weights can be applied to two copies of raw RF data on receive. For example, received signals can be acquired after using plane wave imaging on transmit, and are described by Eq. 1, where $V_R$ is the received voltage, $A_{R,i}$ are the received apodizations, $V_T$ is the transmit voltage, and $R_f$ is the focus distance (for plane wave imaging, $R_f$ can be set to infinity):

$$V_R(t) = \sum_{i=1}^{N} A_{R,i} V_T\left(t + \frac{2R_f}{c_o}\right). \quad (1)$$

Various apodization combinations can be implemented including: a rectangular window to provide the mainlobe image, with a single square wave cycle to provide the zero-mean image; and a Hamming window padded with zeros on each side to provide the mainlobe image, and a discrete prolate spheroidal sequence (DPSS) function to provide the zero-mean image. In this example, a DPSS is a Slepian sequence for which the sidelobe energy outside a given frequency band is reduced or a minimum. The received signals can then be beamformed, envelope-detected, and normalized such that each image has the same maximum value. They are then subtracted:

$$E(V_{R,3}(t)) = |\epsilon E(V_{R,1}(t)) - E(V_{R,2}(t))|, \quad (2)$$

where $\epsilon$ is a scale factor associated with the first received signal and can be adjusted to cancel sidelobes. Without this scale factor, sidelobes resulting from the subtraction may be higher due to the large differences in magnitude between the two images at the sidelobe locations. Increasing this scale factor increases the magnitude of the main image relative to the null image. As the scale factor increases, the sidelobe levels of the final image decrease, but the mainlobe width increases. Thus, on a case by case basis, a scale factor can be selected such that a minimum beamwidth is achieved for a given maximum sidelobe level.

System 100 can also apply a bridging technique where the zero-mean apodization has a DC constant c added thereto, which gives the second apodization:

$$A_{R,i} = \begin{cases} 1: & 1 \le i < \dfrac{N}{2} \\ -1: & \dfrac{N}{2} \le i \le N \end{cases} \quad (3)$$

$$A_{R2,i} = A_{R,i} + c. \quad (4)$$

Figure 4A:
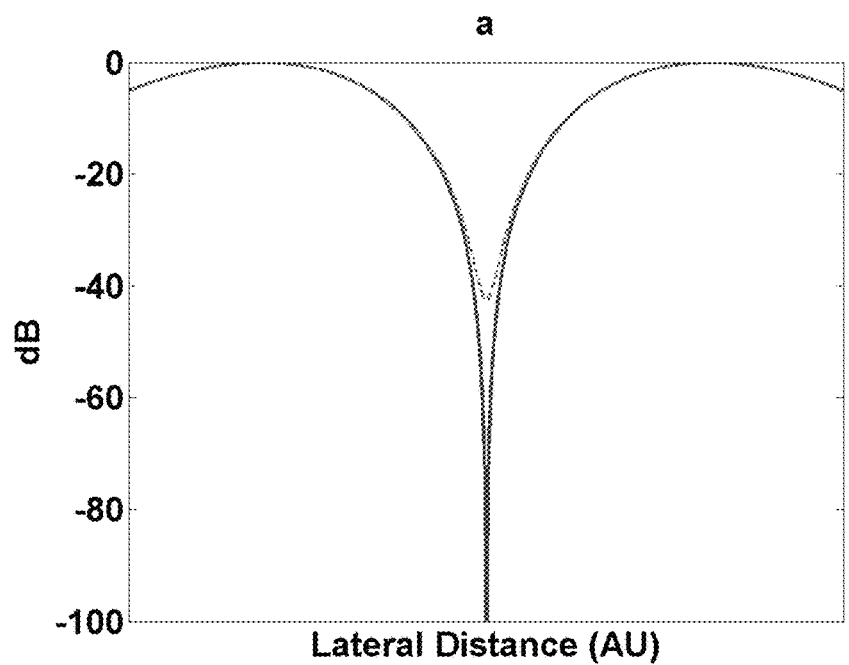
FIGS. 4A and 4B depict beam patterns of a transducer apodized with a zero-mean function (solid line), and a "bridged" function (dashed line): (A) the constant added to this zero-mean function was 0.01 and (B) the constant added to this function was 0.05.
Figure 4B:
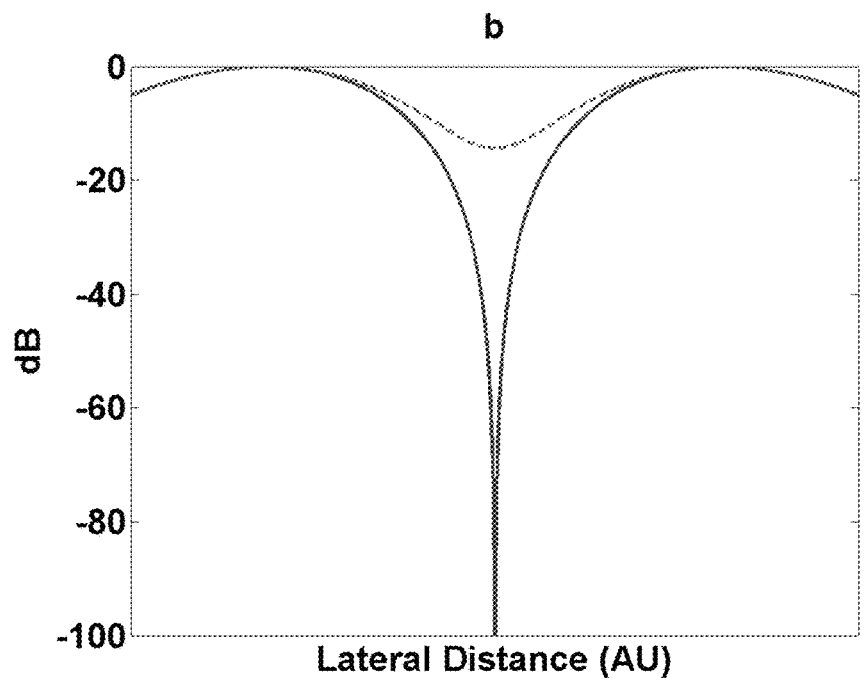
Figure 5A:
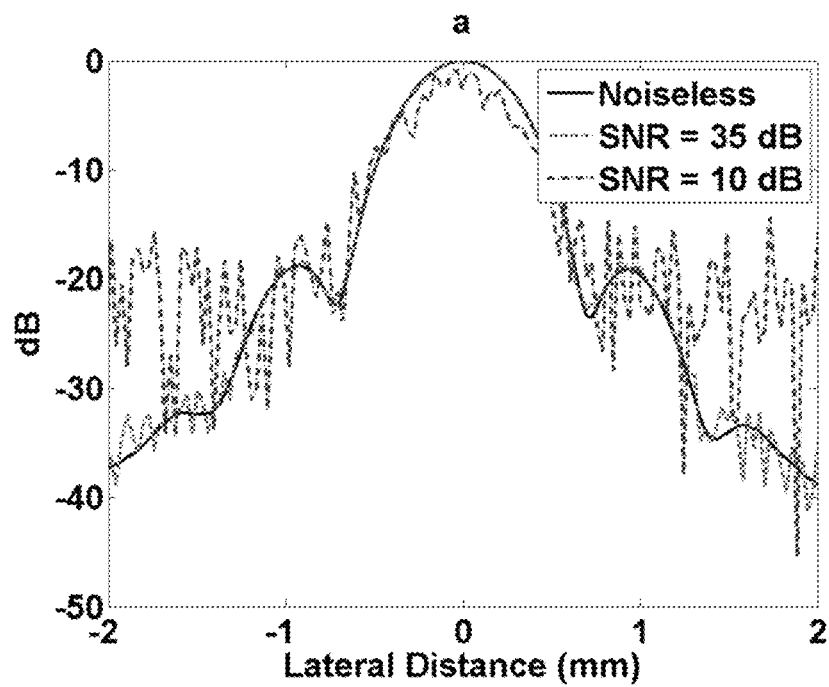
FIGS. 5A-5D depict simulations of a point target located at the elevation focus of the simulated transducer array: (A) rectangular apodization; (B) rectangular apodization subtracting a square wave zero-mean apodization; (C) square wave bridge apodization subtracting a square wave zero-mean apodization; and (D) DPSS bridge apodization subtracting a DPSS zero-mean apodization.
Figure 5B:
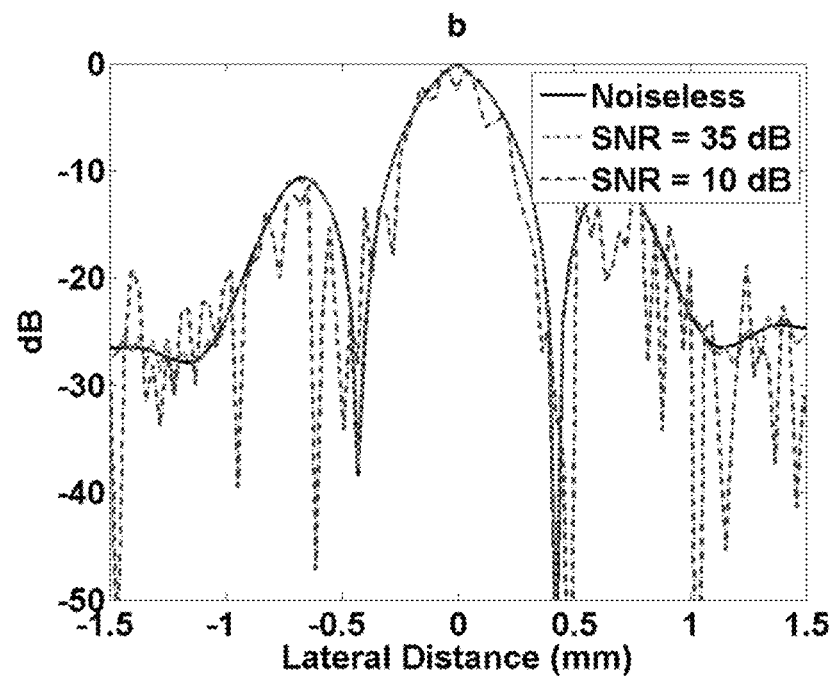
Figure 5C:
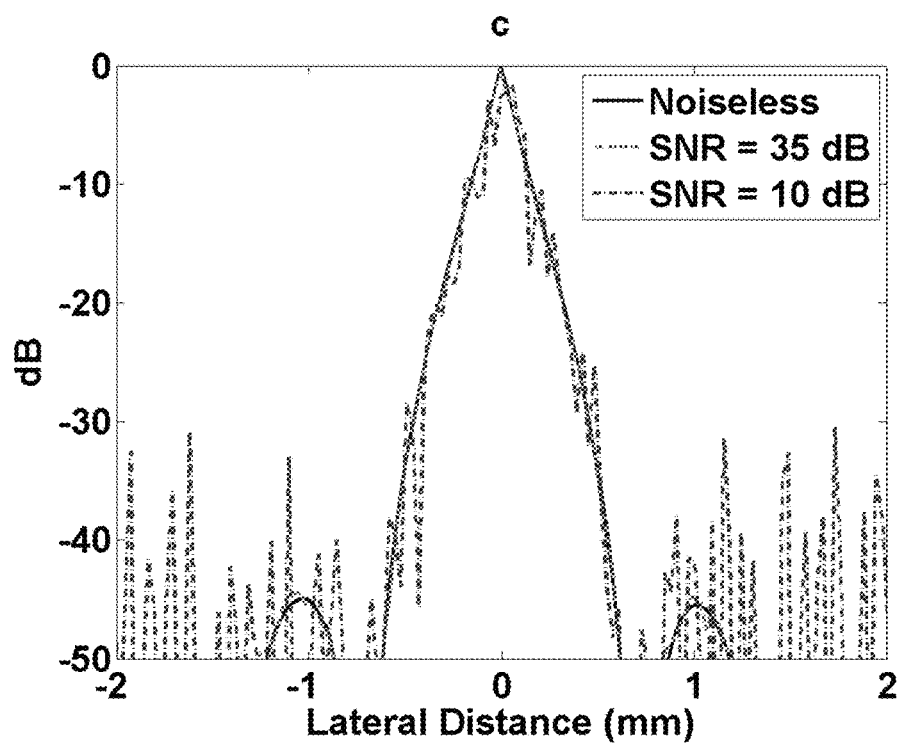
Figure 5D:
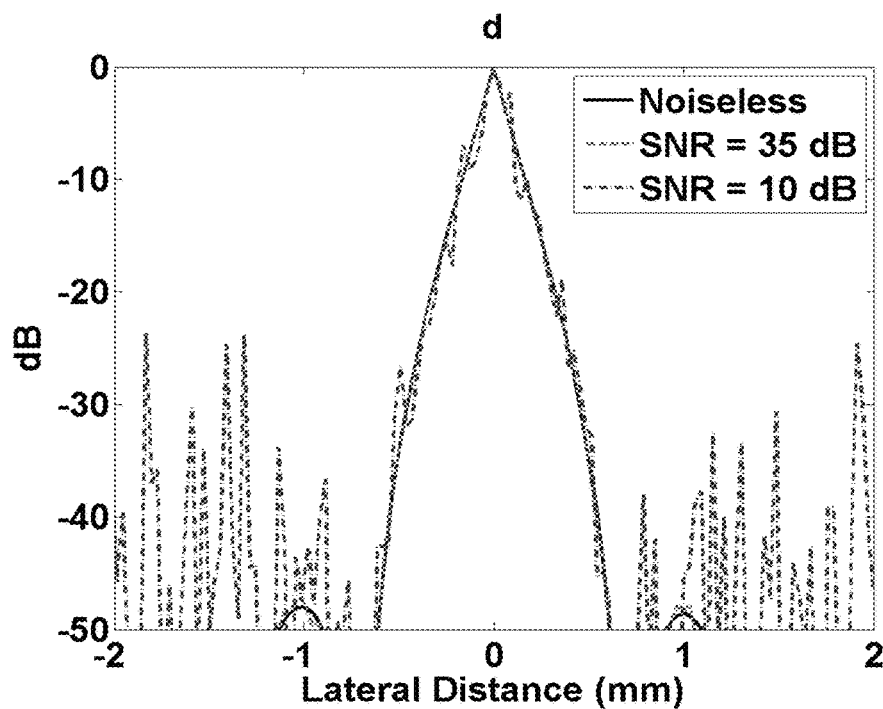
Figure 8A:
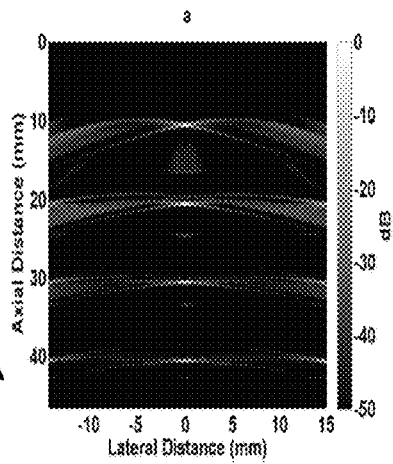
FIGS. 8A-8F depict simulations of point targets in a noise-free region where 32 element sub-apertures were used with fk migration to beamform and a rectangular apodization (solid line) and a DPSS bridge apodization approach (dashed line) were also used: (A) image generated using the rectangular apodization scheme: (B) image generated using the DPSS bridge apodization scheme; (C) cross section of a target at a depth of 1 cm; (D) cross section of a target at a depth of 2 cm; (E) cross section of a target at a depth of 3 cm; and (F) cross section of a target at a depth of 4 cm.
Figure 8B:
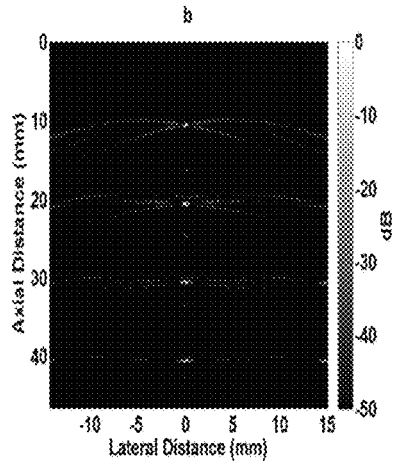
Figure 8C:
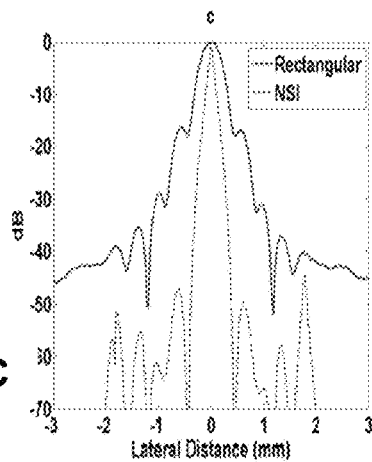
Figure 8D:
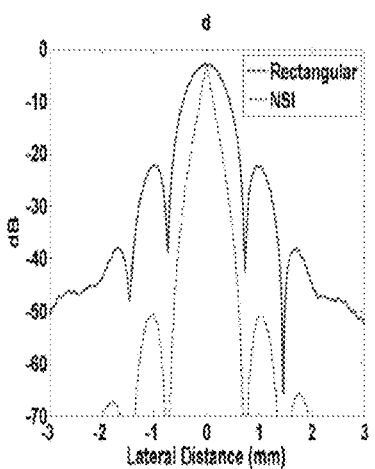
Figure 8E:
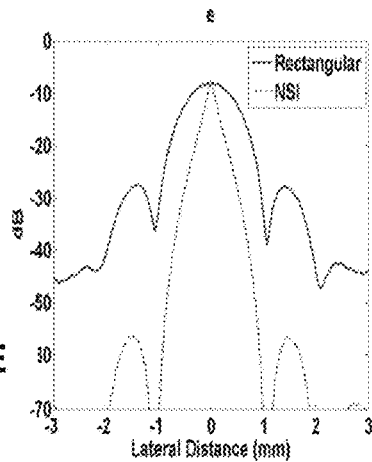
Figure 8F:
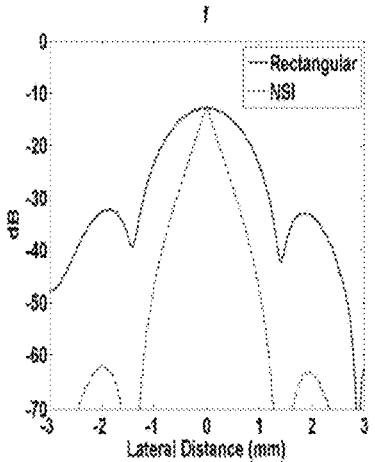
Figure 9A:
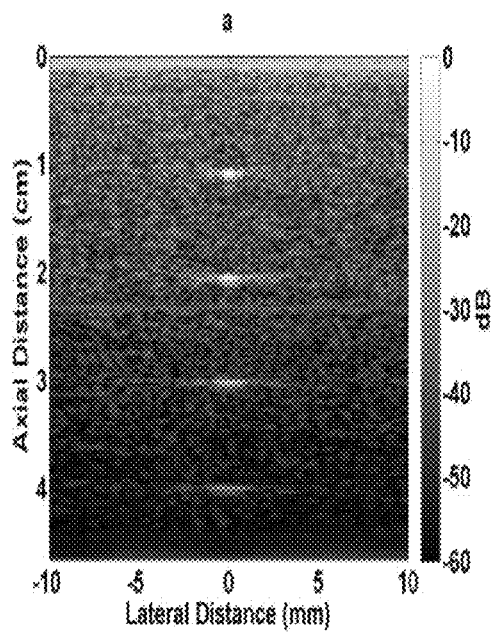
FIGS. 9A-9D depict images of wire targets in an ATS539 phantom using different apodization schemes and sub-aperture configurations: (A) image taken using a 32-element sub-aperture configuration with a rectangular apodization; (B) image taken using a 32-element sub-aperture configuration with a DPSS bridge apodization scheme; (C) image taken using a 64-element sub-aperture configuration with a rectangular apodization; (D) image taken using a 64-element sub-aperture configuration with a DPSS bridge apodization scheme.
Figure 9B:
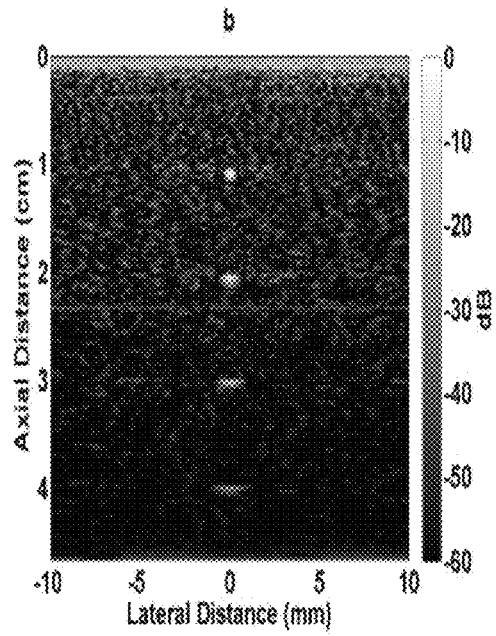
Figure 9C:
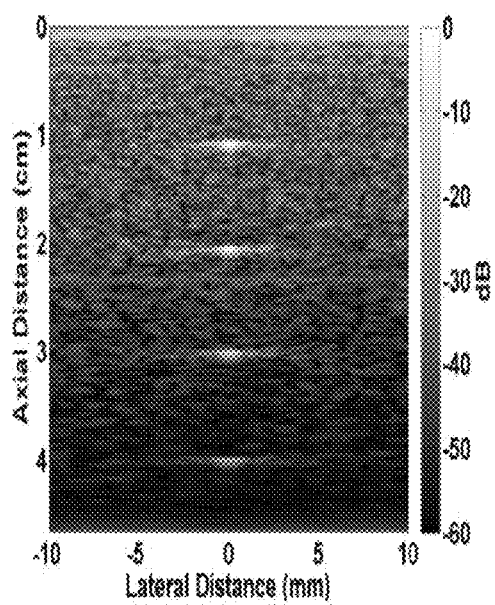
Figure 9D:
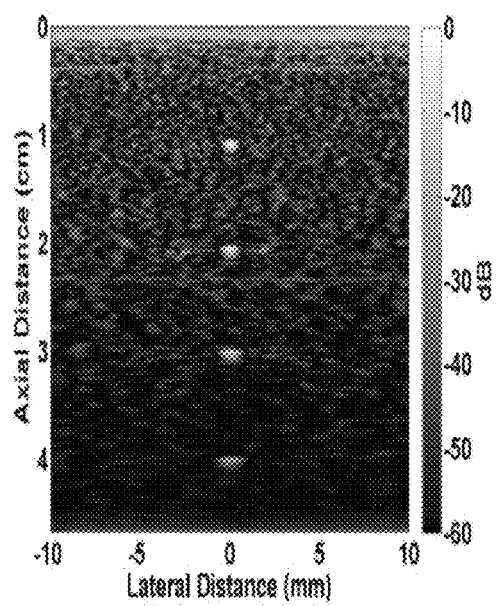

Because using this apodization may put more energy on one side of the beam pattern, a third apodization can be constructed by flipping the second apodization. Unlike in the masking technique described above, which may consist solely of subtraction, these two new apodized images can be beamformed, envelope detected, and added together to produce a new image, i.e., the DC apodization image. This DC apodization image can be nearly equivalent to that of one taken with the null producing apodization, except with a "bridge" of small, positive nonzero values between the two mainlobes of the null beam pattern. FIGS. 4A and 4B illustrate graphs of the beam patterns with and without the bridging. The signals acquired using the zero mean apodization are then beamformed, envelope-detected, normalized such that they have the same maximum value, and subtracted from the DC apodization image, except this time without a scaling factor. In this DC apodization bridging technique, an adjustable parameter can be utilized which is the amount of DC bias applied to the apodization weights. For example in FIGS. 4A and 4B, two different DC bias levels were used. By increasing the DC bias, the level of the "bridge" was increased. The level of the DC bias allows a tradeoff between sidelobe levels and mainlobe width. However, above a certain level increasing the DC bias may not do anything to improve mainlobe width but may still increase sidelobe levels.

EXAMPLES

A first apodization technique was simulated based off of a single cycle square wave apodization, i.e., the example used in Eqs. 3 and 4. A small DC constant was then added to this function to give the second apodization in this scheme, and the second apodization was then transposed or flipped to give the third apodization.

To test the influence of noise on the NSI approach, zero-mean white Gaussian noise was added to the pre-beamformed RF data from the wire targets at SNRs of 35 dB and 10 dB using an awgn( )function of the Matlab® computer software for matrix calculation. Matlab® is a registered trademark of Mathworks Inc. of Natick, Ma. The SNRs before and after beamforming were then calculated by subtracting the image without the added noise from the noisy image, leaving effectively an image only comprised of noise. The SNR was then computed from this image as $$SNR = \log\left(E_i\left[\underset{t}{\mathrm{Var}}(V_R(t, i))\right]\right) \quad (6)$$

which is the log average of the variances of each scan line in the image. DAS beamforming using NSI apodization and rectangular apodization were used to reconstruct the images. The beamwidth, MSR and SNR were quantified for different levels of added noise and compared between the apodization schemes.

Finally, the speckle statistics were quantified for NSI and compared to rectangular apodization. The reason for this calculation was because of the nature of the images produced by NSI resulting in very point-like speckle targets and giving rise to speckle that was not fully developed. Specifically, the speckle SNR was calculated as $$sSNR = \frac{\langle |E| \rangle}{[\langle |E|^2 \rangle - \langle |E| \rangle^2]^{\frac{1}{2}}} \quad (7)$$

where |E| represents the envelope of the image.

A second apodization technique was simulated according to a DPSS window with a time half bandwidth product of 2. This function resembles a single cycle sine wave with tapered ends. A small DC constant was then added to this function to give the second apodization in this scheme, and the second apodization was then flipped to give the third apodization.

To predict performance of these apodization schemes simulations were conducted using Field-II. Simulations were first conducted on a single point target located at the elevation focus of the simulated array to compare the utility of the masking and bridging apodization approaches. An L9-4/38 array transducer was simulated to match the physical experiments. The simulated array had a pitch of 0.3048 mm, an element width of 0.2698 mm, an elevation focus of 19 mm, and a bandwidth of 4-9 MHz with a center frequency of 5 MHz. A plane wave was simulated in transmission. For the masking technique an $\epsilon$ of 1.5 was used, for the DPSS bridge a c of 0.05 was used, and for the rectangular bridge a c of 0.3 was used. Beamforming on receive was achieved using Stolt's fk-migration with 32 element sub-apertures of the transducer array. Images were generated using Field II and the apodization schemes were implemented. The width of the mainlobe was estimated at −3 dB. The sidelobe levels were estimated and the mainlobe to sidelobe ratio (MSR) was calculated in dB for each apodization approach. To compare the utility of the technique under noisy conditions, additive white Gaussian noise was added to the simulated RF data before beamforming at signal to noise ratios (SNR) of 35 dB and 10 dB. After beamforming, the mainlobe width was again estimated at −3 dB.

In a second set of simulations, the same simulated array was used to image a set of point targets that were placed on axis at depths of 1, 2, 3 and 4 cm. Only the bridging technique was used in the second set of simulations. The performance of the bridging technique in terms of lateral resolution and MSR was determined to be better than the masking technique. Because the length of the active portion of the simulated array was approximately 10 mm (actual length 9.5 mm), the targets lined up approximately with the f/#'s for focusing. For each target, the mainlobe width was estimated at −3 dB, sidelobe levels were estimated, and the MSR was calculated for each apodization approach.

To validate the simulations and to further assess the performance of the novel apodization schemes, experimental measurements were acquired from an ATS539 phantom using an L9-4/38 clinical array transducer (measured center frequency of 5 MHz) and an Ultrasonix RP with a SonixDAQ. A plane wave at broadside was emitted from the transducer array. To reconstruct the images, f-k migration using an exploding reflector model was used and the exemplary apodization schemes were added to the process. Instead of reconstructing the image using all 128 scan lines of data received on all of the channels, the transducer array in this example was broken into 32 element sub-apertures for apodization and the f-k migration technique was applied on each 32 element sub-aperture. The sub-aperture on the left edge of the array was first reconstructed to create the first image scan line. For each sub-aperture, the apodization schemes were applied on the raw unreconstructed data. The same c values used for the simulations were also used to process the experimental data. Next, the sub-aperture was shifted to the right by one element and the next scan line was reconstructed from the next set of 32 elements. Each scan line was constructed by shifting the bank of 32 elements in use down the length of the array (i.e., a linear sequential scan mode using f-k migration). As the results show, the −3 dB beamwidth was often smaller than the pitch of the array. Therefore, to more accurately characterize the beamwidth of null subtraction imaging, a finer lateral resolution was utilized. This was accomplished by acquiring 128 scan lines using the linear sequential mode then physically moving the array laterally in steps of 5 microns to fill in additional scan lines. At each position of the array, a new set of 128 scan lines was acquired. In total, to span the pitch of the array, the array was moved 61 times with the 5 micron step size. In addition and for comparison, 64 element sub-apertures were used to beamform the same set of data. The ATS539 multi-purpose phantom was used to test the effectiveness of the technique at varying depths, and to evaluate if the technique affected the contrast to noise ratio (CNR) of contrast targets in the phantom, with CNR defined by:

$$CNR = \frac{\mu_{in} - \mu_{out}}{[\sigma_{in}^2 - \sigma_{out}^2]^{\frac{1}{2}}}, \quad (5)$$

where $u_{in}$ is the mean of the normalized envelope data of the image (E) inside the target, $u_{out}$ is the mean of E outside the target, $\sigma^2_{in}$ is the variance of E inside the target, and $\sigma^2_{out}$ is the variance of E outside the target.

In addition to the contrast targets, the phantom contained a variety of wire targets in different configurations. These wire targets were made of nylon and had a diameter of 0.12 mm. The L9-4/38 was positioned over the ATS phantom scan window and pulse excited plane waves were emitted at a frequency of 5 MHz and 128 lines of RF data on receive were acquired at a sampling frequency of 40 MHz.

Simulation results of the single point target simulations using the different apodization schemes are shown in FIGS. 5A-5D. The MSRs were calculated by taking the maximum sidelobe magnitude divided by the mainlobe magnitude at each target depth and converting to dB. Table 600 of FIG. 6 lists the width of the main lobe at −3 dB and the MSR for each apodization scheme. The point targets were placed at a depth of 19 mm. The bridging method provided better lateral resolution and MSR levels compared to the masking method. The next set of simulations simulated four point-targets in the field, placed at increasingly larger focal depths on axis. The beamwidth and MSR were examined at each focal depth using the DPSS bridge apodization scheme (as this was determined to have the best MSR with significant improvement in beamwidth), and compared with the rectangular apodization.

Figure 10A:
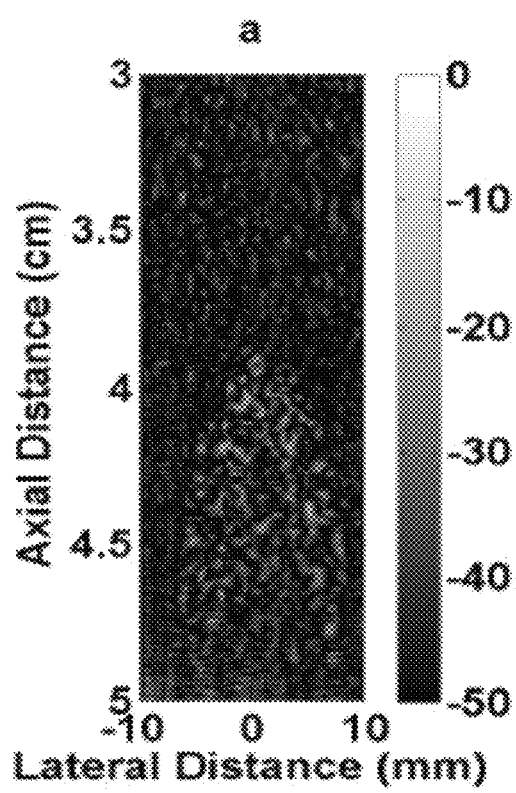
FIGS. 10A-10B depict images of contrast targets in an ATS539 phantom using a 64 element sub-aperture configuration and different apodization schemes: (A) image taken using a Rect bridge apodization scheme; and (B) image taken using a rectangular apodization.
Figure 10B:
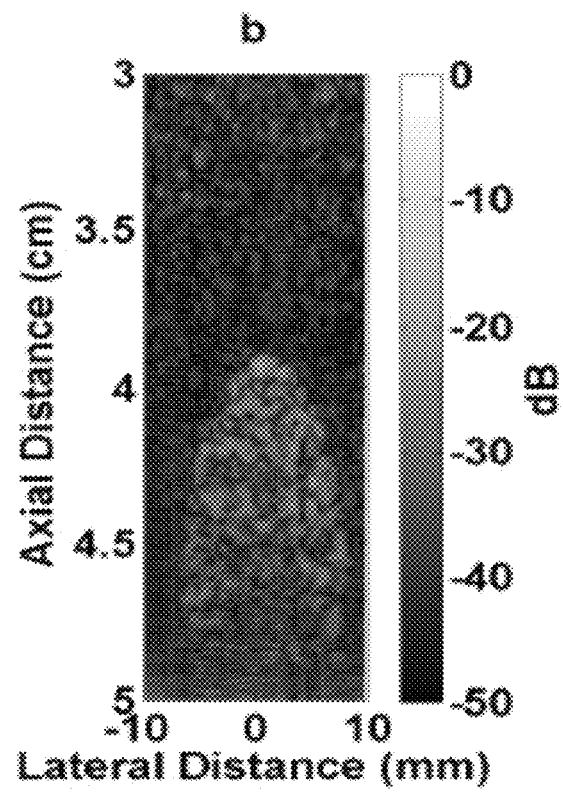

FIGS. 8A-8D illustrate the results of the four point-target simulations at successive depths using the rectangular and DPSS bridge apodization schemes, and Table 700 of FIG. 7 lists the associated metrics. The −3 dB beamwidth values using the DPSS bridge scheme were smaller by almost a factor of six compared to rectangular apodization with sidelobe levels almost 30 dB below the rectangular apodization. Results from the wire-target experiments using the ATS phantom are shown in FIGS. 9A-9D and 11. Like the simulations, two apodization schemes were used, the DPSS bridge scheme and the rectangular apodization for comparison. The beamwidth was estimated at the −3 dB point taken from cross sections of the image at the successive focal depths. The MSR was also estimated at these cross sections. CNR was estimated by calculating the mean and variance of the image intensities inside and outside the contrast targets imaged in the ATS phantom. The mean and variance of the intensity values for inside and outside the targets were calculated at the same range depth. B-mode images of the contrast targets using the NSI and rectangular apodization are, shown in FIGS. 10A and 10B.

The beamwidths that were estimated at the single point target under the different null-subtraction apodization schemes provided significant improvement over the diffraction-limited rectangular apodization, about 0.3 mm smaller beamwidth estimated at −3 dB for the masking scheme, and about 0.5 mm smaller beamwidth estimated at −3 dB for the bridge schemes. However, for the masking scheme to achieve the lateral resolution enhancement, the sidelobes grew with respect to the mainlobe levels by 9 dB. The simulated transducer was focused at 19 mm, which provides an f-number (f/#) of approximately 2. For comparison, predictions of beamwidth were calculated using the following equation:

$$D_f = 1.41 \lambda f^\# \quad (8)$$

According to Eq. 6, which is a rule of thumb for calculating beamwidths at different foci for an unapodized circular aperture, the beamwidth at 19 mm depth should be 0.60 mm based on a frequency of 5 MHz (the center frequency of the array used), which is close to the value that was obtained using the rectangular apodization. However, using the bridging apodization scheme, a beamwidth of 0.09 mm was observed, which was approximately a factor of six smaller than the rectangular apodization. When beamformed with noise at an SNR of 35 dB, the results were the same for the mainlobe width. When beamformed with noise at an SNR of 10 dB, the mainlobe degraded due to the high variance in the noise. Therefore, the null subtraction imaging is robust against low SNR and the mainlobe only degrades with low SNR. Because the improvement in the beamwidths for the point targets was about the same between the two bridge schemes, only the DPSS bridge was used for the successive-depth point target simulations because of its lower sidelobes.

The values observed in the point target simulations for the −3 dB beamwidths followed closely to the theoretical values predicted by Eq. 6 in the unapodized case, becoming slightly wider with increasing depth. The improvements using the bridging apodization scheme compared to the rectangular apodization in the successive-depth point target simulation was similar to the single point target simulations, i.e., an improvement in lateral resolution of 5 to 6 times using the bridging apodization. The bridge schemes had lower MSRs than the masking schemes, with both bridge schemes improving the MSR over the rectangular apodization by more than 20 dB. However, the more significant improvement was in the DPSS bridge scheme. The MSR for the DPSS bridge scheme was about 28 dB lower than that of the rectangular apodization in both simulations at every point target. Significant improvement in the MSR for the masking scheme could be obtained by increasing the scale factor associated with the masking scheme, but doing so would sacrifice lateral resolution to a point where it wouldn't be viable compared to the bridging schemes.

For the different sub-aperture configurations, results varied because the f/#'s associated with each target changed due to the depths of the targets, while maintaining a constant aperture. Similar to the simulations, the lateral resolution estimated from the small wire targets was a factor of five to six times smaller for the bridging apodization scheme compared to simple rectangular apodization. At the same time the MSR was much smaller for the bridging apodization, i.e., approximately 10 dB smaller. For the 32 element configuration, the narrowest beamwidths were obtained by using null subtraction imaging. In table 11, the beamwidth values are shown in terms of wavelength. Unlike in the simulations, the rectangular bridge apodization was observed to have the greatest improvement in lateral resolution and sidelobe levels. Based on imaging the small wire in the ATS phantom, at 1 cm the null subtraction imaging (rectangular bridge) at 1 cm had a beamwidth of 0:18λ, whereas the result obtained using the rectangular apodization function was 1:25λ. The beamwidths increased with depth. However, the beamwidths increased much less dramatically with null subtraction imaging. For null subtraction imaging, the beamwidth at 1 cm was more than six times narrower compared to the rectangular apodization. This substantial improvement slightly decreased with successive depths, but at each depth an improvement in lateral resolution by a factor of at least 4.8 was observed. Curiously, the estimated −3 dB beamwidth from the wire target located at 1 cm in depth was 0.06 mm, which also happens to be the radius of the wire target. If the −3 dB beamwidth is an accurate representation of the lateral point spread function of the source, then the results would indicate that the beamwidth was point like at 1 cm depth. To test this, a much smaller wire target, i.e., diameter of 15 microns, was imaged at 1 cm depth in water using the bridging apodization. The 1 cm target from the ATS phantom is compared with the 15 micron wire target in FIG. 12. The −3 dB beamwidth estimated from the 15 micron wire target was 0.11 mm. This was lower than the results observed from the ATS phantom experiments. The differences in the scattered fields from the wires may have resulted in filtering of the signals. Based on calculations of scattering from cylinders, scattering from a tungsten wire of 15 micron diameter low pass filters the signal at 5 MHz and the scattering from the 120 micron nylon wire high pass filters the signal at 5 MHz. Hence, the wavelength of the received scattered signal is larger for the tungsten wire than the nylon wire producing a larger perceived beamwidth for the tungsten wire.

For the 64 element sub-aperture configuration, at each successive depth beamwidths for null subtraction imaging were approximately five times narrower when compared to the rectangular apodization. Although the beamwidth for the 64 elements aperture was narrower than the 32 element configuration, the beamwidth was not narrowed by a factor of two when compared to 32 elements. This conflicts with the theoretical values because with a 64 element sub-aperture, the transmit aperture is twice as wide as the 32 element sub-aperture and should therefore result in halving of the beamwidth at each successive target depth according to Eq. 6. For the 32 and 64 element sub-aperture configurations, sidelobe levels were about 30 dB down from the value of the mainlobe for the null subtraction imaging images. For the rectangularly apodized images, sidelobes were about 15 dB down in all cases with the exception of the 1 cm case, where it was 20 dB down. The CNR decreased when using null subtraction imaging as opposed to the rectangular apodization. Using null subtraction imaging, a CNR of 0.26 was obtained, while using a rectangular apodization yielded a CNR of 0.97. This sharp decrease in CNR was due to the same reason that the sSNR decreased when using null subtraction imaging. The CNR metric decreased as the variance of the speckle increased. In the case of the null subtraction imaging image, the speckle became very small and as a result, the image was more spotty with what appeared to be dark holes in the image and as a result a larger variance of the intensity. On the other hand, the image constructed using rectangular apodization provided a smoother appearance in the contrast target resulting in lower variance in the intensity of the image. This observation could occur because the resolution cell with null subtraction imaging became much smaller and the speckle statistics were not fully developed. On the other hand, with smaller speckle size, it may be possible to detect smaller lesions using null subtraction imaging. Furthermore, null subtraction imaging may provide an extended tradeoff between angular/spatial compounding of images and loss of spatial resolution, thereby potentially improving contrast of targets.

With null subtraction imaging, a factor of improvement of at least 4.8 times compared to the rectangular apodization was achieved experimentally. In experiments, a maximum improvement in lateral resolution greater than 6.9 times was observed with null subtraction imaging compared to rectangular apodization. Improvements in sidelobes by an average of 11 dB over the rectangular apodization were also observed.

As a further test of spatial resolution afforded by the NSI approach, two wire targets spaced close together were imaged using rectangular apodization and NSI (c=0.05). The images of the two wire targets are shown in FIGS. 12B-12C, with a 40 dB dynamic range for better visualization. The images indicate that the NSI method was able to distinguish between the two wires whereas the rectangular apodization image showed the two wires smeared together.

Figure 12A:
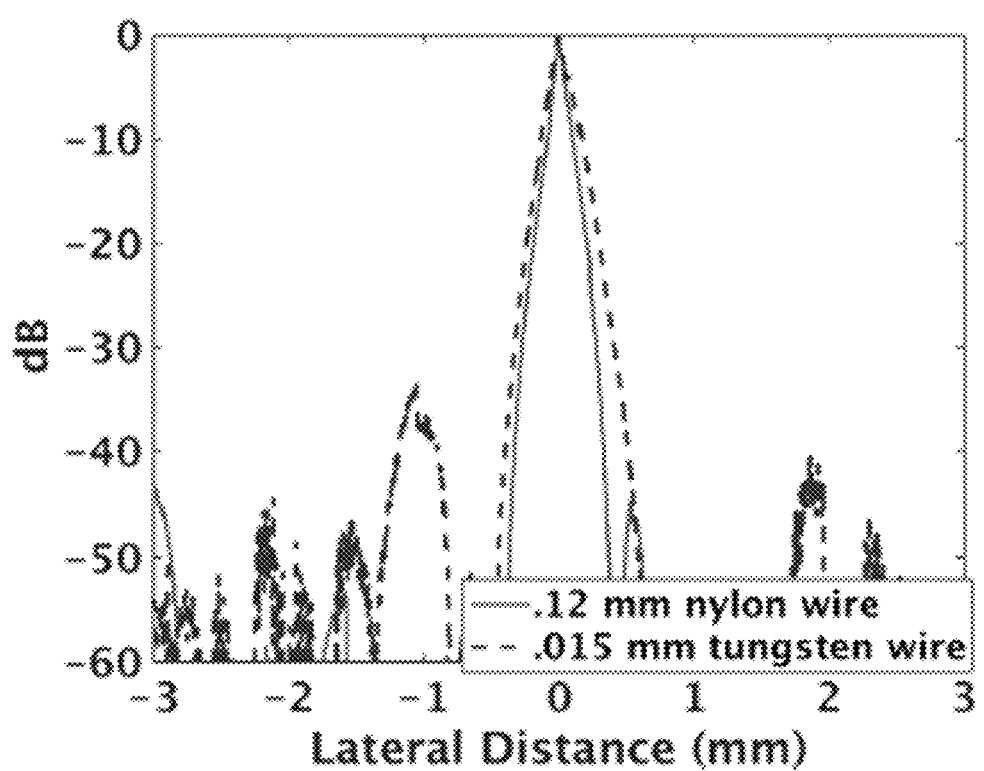
FIG. 12A depicts beamwidths of a 120 micron diameter nylon wire (solid) and a 15 micron diameter tungsten wire (dashed).
Figure 12B:
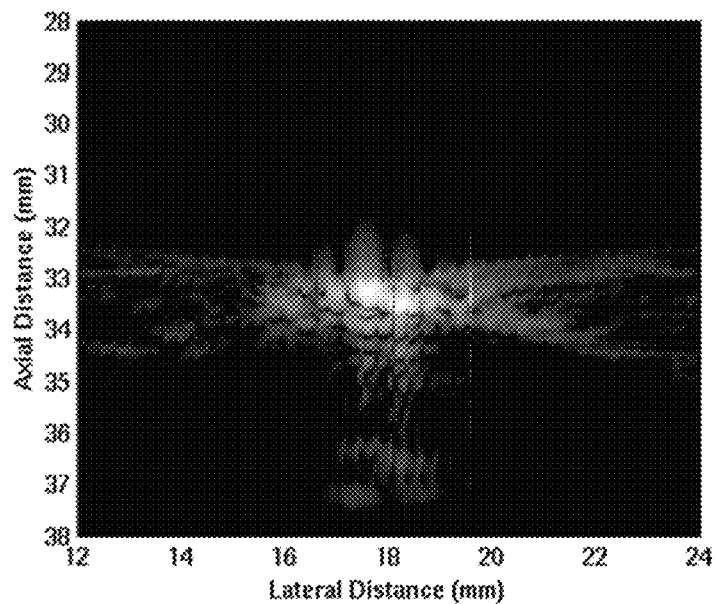
FIGS. 12B-12C depict images of two closely spaced wire targets.
Figure 12C:
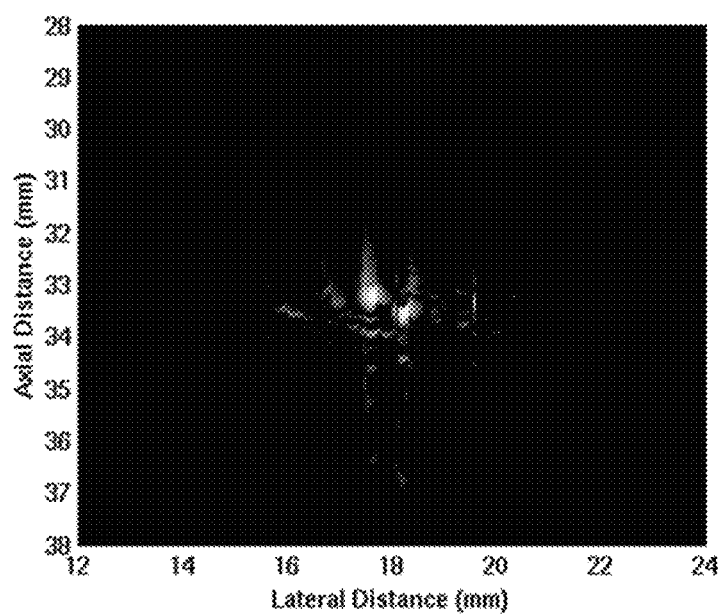
Figure 12F:
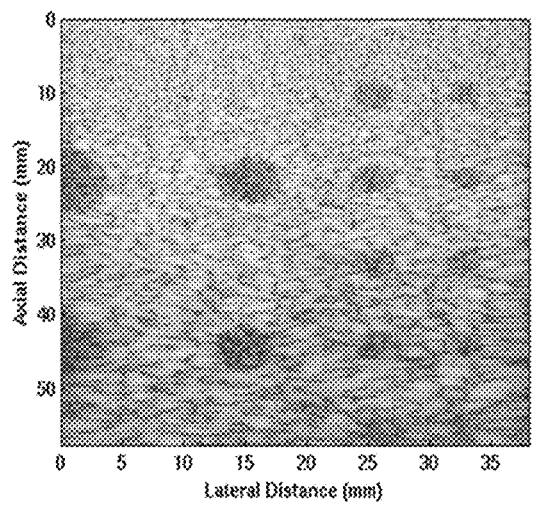
FIGS. 12F-12H depict images of the ATS539 phantom's anechoic targets.
Figure 12G:
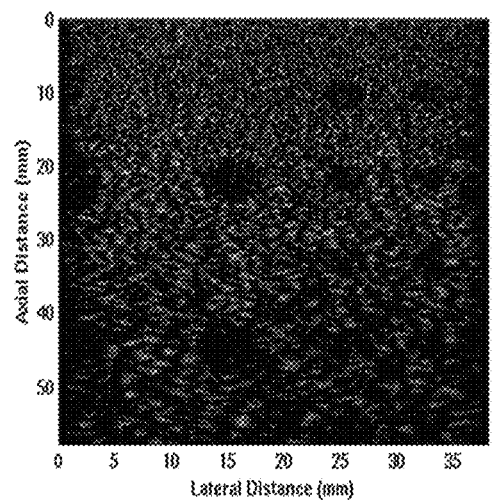
Figure 12H:
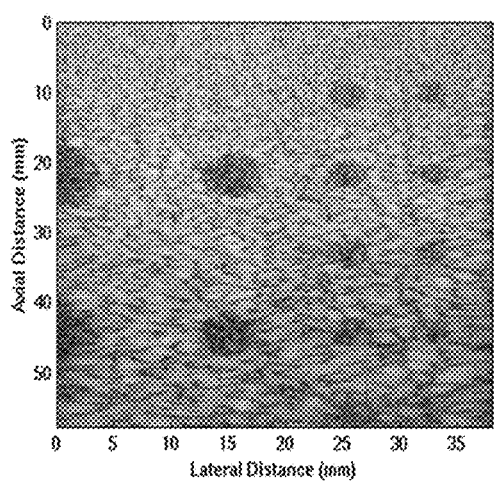

The images from anechoic targets are shown in FIGS. 12F-12H and the CNR values are listed in the table of FIG. 12E for the different apodization schemes. FIG. 12F depicts an image of the anechoic targets according to rectangular apodization. FIG. 12G depicts an image of the anechoic targets according to rect-bridge apodization, with a value of c=0.05. FIG. 12H depicts an image of the anechoic targets according to compounded NSI and B-mode, weight factor of 50%. A dynamic range is 60 dB. When examining anechoic targets, the magnitude of the CNR was observed to decrease for NSI compared to rectangular apodization. For the anechoic targets (FIGS. 12E-12G), a CNR of −0.42 was obtained using rect-bridge NSI, while using a rectangular apodization yielded a CNR of −0.83. Therefore, based on the CNR metric the NSI scheme greatly reduced the ability to detect the anechoic targets.

Figure 12I:
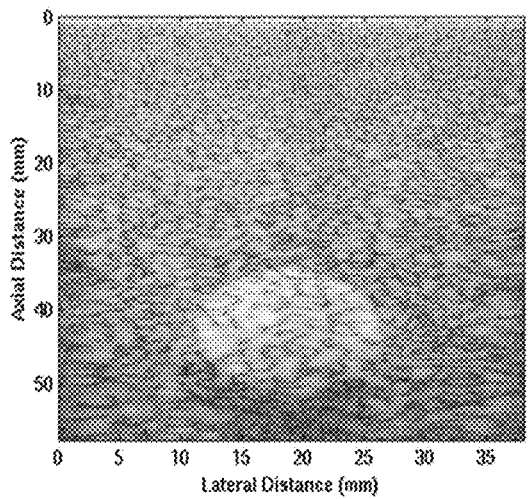
FIGS. 12I-12K depict images of the ATS539 phantom's hyperchoic targets.
Figure 12J:
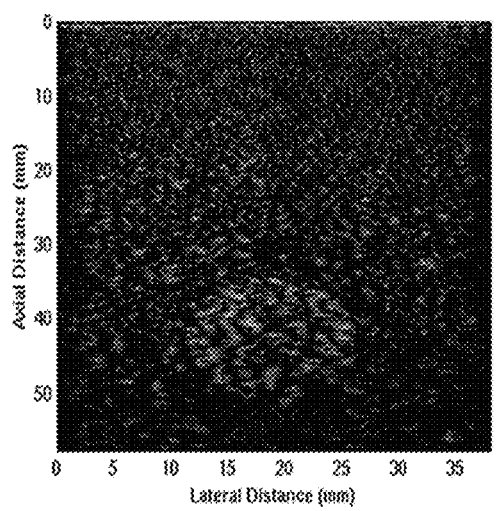
Figure 12K:
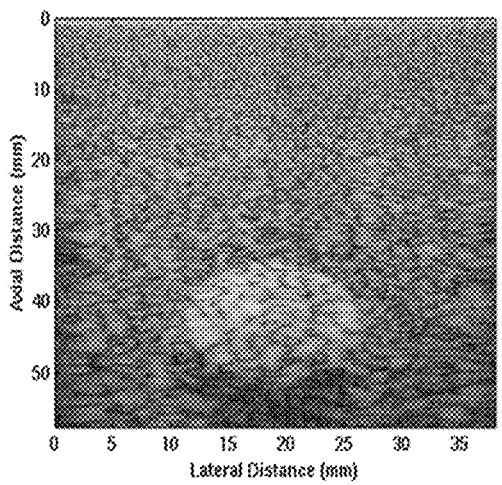
Figure 12L:
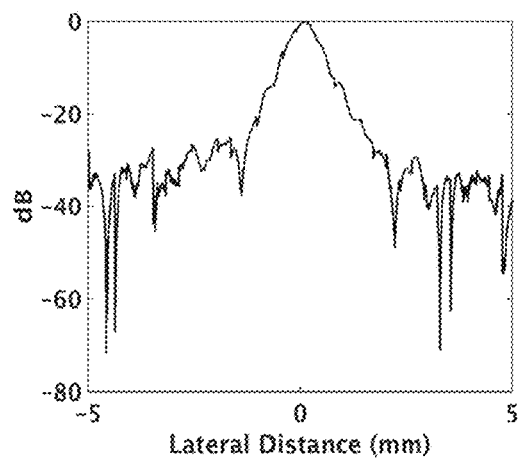
FIGS. 12L-12N depict images of cross sections of the ATS539 phantom's 1 cm depth wire target without white Gaussian noise included prior to beamforming.
Figure 12M:
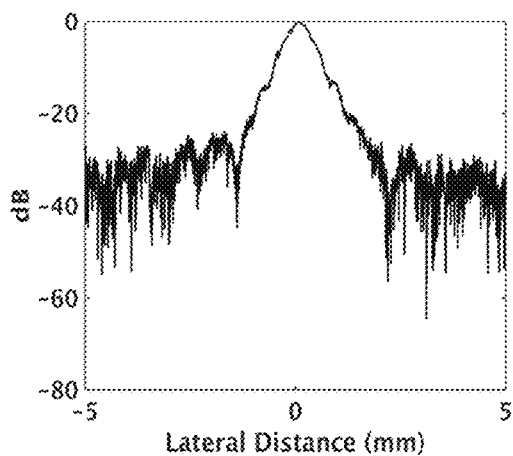
Figure 12N:
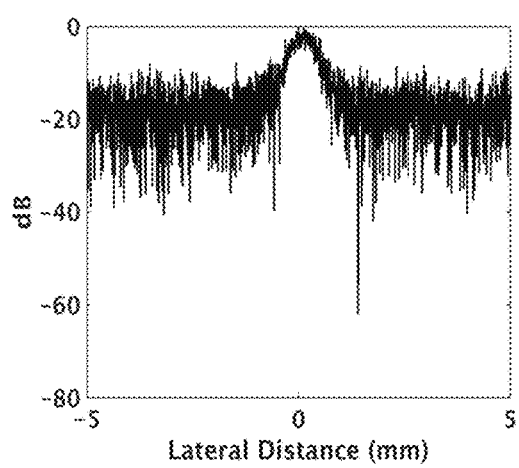
Figure 12O:
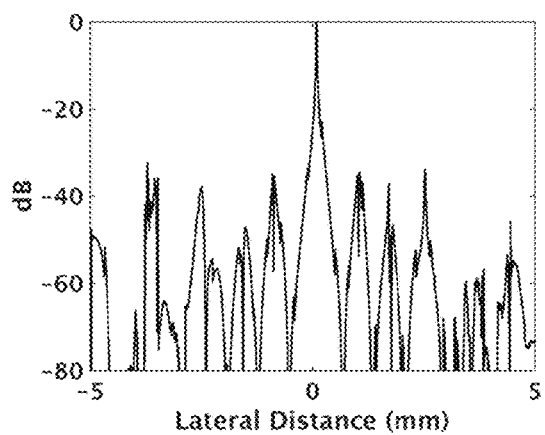
Figure 12P:
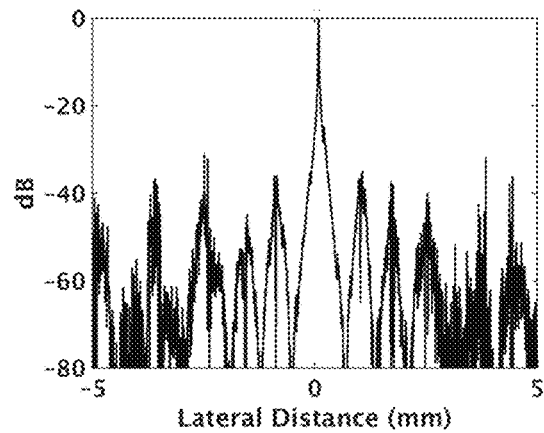
Figure 12L:
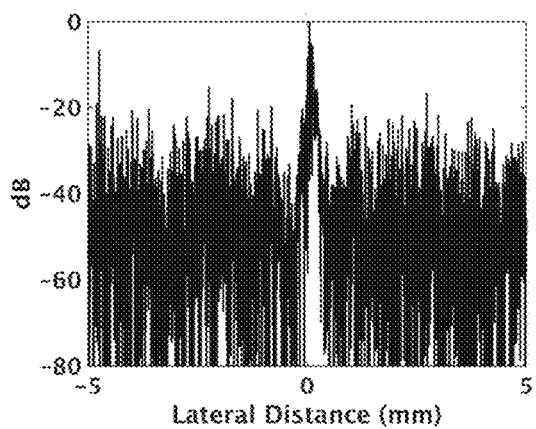
Figure 12S:
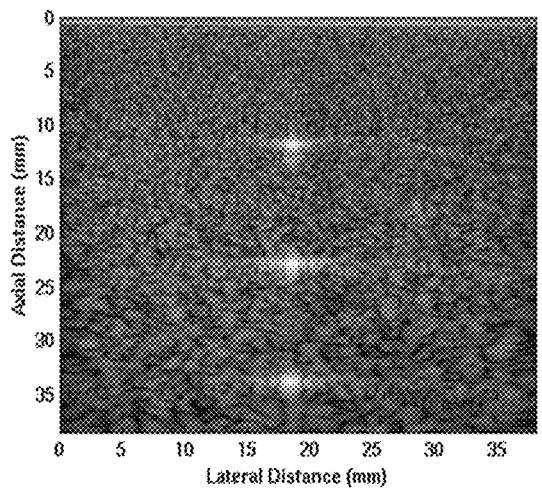
FIGS. 12S-12U depict images of the ATS539 phantom's wire targets.
Figure 12T:
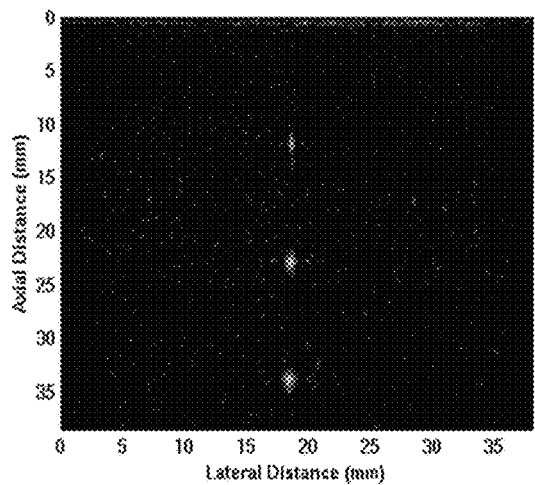

Similar to the anechoic targets, when tasked with detecting and imaging hyperechoic targets, NSI performed worse than rectangular apodization. FIGS. 12I-12K depict images of hyperechoic targets when using the different apodization schemes. FIG. 12I depicts an image of the anechoic targets according to rectangular apodization. FIG. 12J depicts an image of the anechoic targets according to Rect-bridge apodization, with a value of c=0.05. FIG. 12K depicts an image of the anechoic targets according to compounded NSI and B-mode, weight factor of 50%. A dynamic range is 60 dB. The associated CNR values are also listed in the table of FIG. 12E. CNR values for rectangular apodization and rect-bridge NSI were 0.74 and 0.27, respectively.

The reduction of CNR for both the anechoic and hyperechoic targets when using NSI is related to the change in the speckle characteristics that occur due to the nonlinear processing of the images. To quantify this speckle, the sSNR was calculated for images created using NSI and rectangular apodization. An average sSNR of 1.99 was observed for the rectangular apodization, while an average sSNR of 0.68 was observed for NSI. This indicates that for NSI, the speckle was no longer fully developed, i.e., fully developed speckle has an sSNR close to 1.91.

Figure 12U:
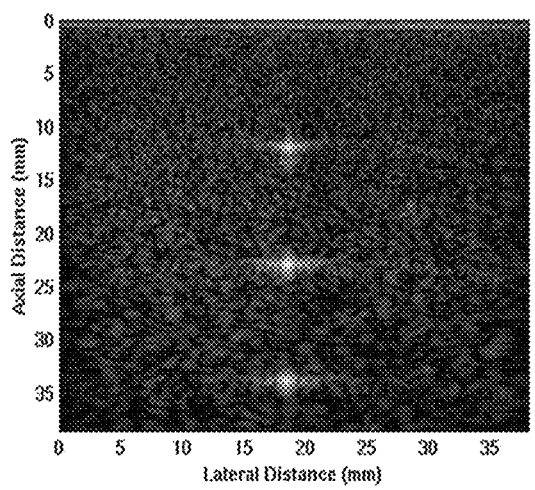
Figure 12V:
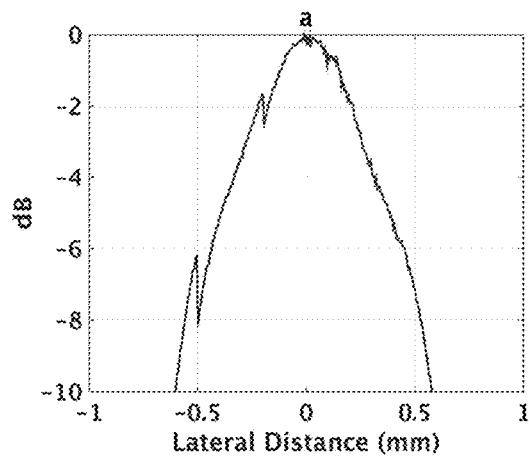
FIGS. 12V-12X depict images of Cross sections of the ATS539 phantom's 1 cm depth wire target.
Figure 12W:
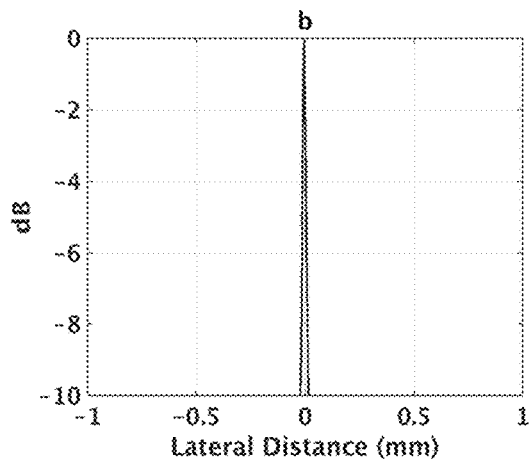
Figure 12X:
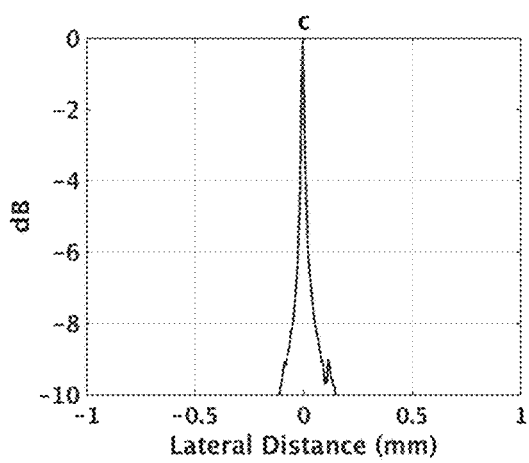

To improve the CNR for both anechoic and hyperechoic targets when using NSI, the rectangular apodized and NSI images were compounded by adding 50% of the magnitude of the rectangular apodized image to the NSI image. FIGS. 12U, 12H and 12K show the compounded images for the NSI rect-bridge for the wires, and both anechoic and hyperechoic targets. While compounding the images mitigated the losses in CNR, it also resulted in a corresponding decrease in the lateral resolution compared to only NSI. The reduction in lateral resolution was estimated by compounding the NSI image that included wire targets with the corresponding B-mode image, and measuring the beamwidth from a lateral cross section as before. This is illustrated by the wire targets images in FIG. 12U and the cross section of FIG. 12X. FIG. 12D illustrates a table listing the −6 dB measurements from the compounded wire images, and FIG. 12E illustrates a table listing the CNR values achieved by compounding. The compounded image reduced the lateral resolution gains of NSI, but the spatial resolution was still improved over rectangular apodization by a factor of 10.

The CNR metric decreased as the variance of the speckle increased. In the case of the NSI image, speckle varies greatly because of the nonlinear processing scheme and the small resolution cell size. This causes the speckle to be underdeveloped, thus decreasing the ability to see contrast between the background speckle and either an anechoic or hyperechoic target. On the other hand, the image constructed using rectangular apodization has fully developed speckle in and around the contrast targets resulting in lower variance in the intensity of the image, and thus higher CNR. The speckle variance for the two images was calculated by taking an axial scan line through the wire targets from the dB-scale envelopes for both the rectangular and NSI images and calculating their respective variances. The rectangular apodization scanline has a variance of 210 dB2, whereas the NSI scanline has a variance of 4600 dB2.

The influence of electronic noise on the ability of NSI to produce images was also assessed. FIGS. 12L-12Q show images of the cross section across the wire targets for different levels of noise added to the pre-beamformed data. FIG. 12R illustrates a table providing the SNRs in the NSI and rectangular images for different levels of pre-beamformed noise. These values were calculated by subtracting the image without the added noise from the noisy image, leaving effectively an image only comprised of noise, scaled with respect to the data. Then, the variance of each scan line was taken, and the average variance was put into a log scale.

A novel apodization scheme, NSI, was evaluated for engaging in specific imaging tasks: detection of point-like targets, detection of anechoic targets and detection of hyperechoic targets. The NSI imaging technique takes advantage of the sharp roll-off of nulls in the beam pattern to produce images that can have dramatically improved lateral resolution while still maintaining low sidelobe levels. Improvements in lateral resolution can be realized according to subtraction of envelope-based images, which results in a nonlinear image processing scheme.

Based on the images produced by NSI for specific imaging tasks, several important observations can be made. First, when imaging wire targets, NSI was able to produce images with very high lateral resolution, i.e., more than 25 times better than rectangular apodization (the diffraction limit). At the same time, this improvement in lateral resolution was also associated with a decrease in the sidelobe levels of the beam as evidenced by the increased estimates of MSR. Furthermore, from FIGS. 12S-12U, the NSI approach appeared to suppress speckle surrounding the small bright targets in the field, making these targets stand out more than with rectangular apodization.

The wire target images suggest that an imaging mode using NSI could perform better at detecting small specular targets in the field more than traditional apodization approaches. In this regard, applications for NSI could include the detection of microcalcifications. Microcalcifications are small deposits of calcium in the body that typically form in clumps. The presence of microcalcifications in breast tissue or thyroid is an important indicator of cancerous tissue; however, medical ultrasound currently has a limited role in their detection. This is because microcalcifications, while highly reflective, are small compared to the beamwidth of ultrasound and are thus not easily distinguished from each other. To test the ability of NSI to distinguish multiple closely spaced targets, images were taken of two wires spaced less than 1 mm apart laterally (displayed in FIGS. 12B-12C). NSI was able to clearly differentiate the two wire targets whereas rectangular apodization did not.

For the specific task of imaging anechoic targets, NSI did not perform well compared to rectangular apodization. The CNR decreased dramatically for the NSI images compared to rectangular apodization, i.e., −0.83 to −0.42. This decrease in the CNR is due to the changes that occurred in the speckle characteristics of the NSI images. Specifically, while the images produced using rectangular apodization had fully developed speckle, the NSI images did not have fully developed speckle. The speckle in the NSI images was characterized by very small bright speckle spots. Part of the shrinking of the speckle size may be due to the narrowness of the NSI beam and part of the speckle size reduction is due to the nonlinear processing of the images with NSI. As a result of the changes in the speckle, the intensity variations of the images were much higher and the background of the images was characterized by larger regions of dark space between speckle bright spots. This reduced the ability to detect the anechoic targets.

In an attempt to improve the image quality, the NSI image was compounded with the image created by rectangular apodization. These images are displayed in FIGS. 12U, 12H and 12K. In compounding the images, the drop in CNR was mitigated and the ability to detect the anechoic targets was comparable to rectangular apodization. According to the results listed in the tables of FIGS. 12D-12E, lateral resolution decreased by a factor of 2.5, with the 1 cm depth target, increasing the −6 dB beamwidth from 0.02 mm to 0.05 mm compared to NSI. However, most of the CNR lost due to NSI was recovered with the anechoic target CNR increasing in magnitude from −0.42 dB to −0.82 dB. Furthermore, the lateral resolution in the compounded image was still a factor of five times better than the rectangular apodization image as quantified by the wire targets, see, e.g., the table of FIG. 12D.

The third imaging task was to evaluate NSI for detection of hyperechoic targets. Similar to the anechoic target detection, NSI provided much lower CNR than rectangular apodization. Again, the loss in CNR for NSI was due to the speckle characteristics, which did not have fully developed speckle. Compounding conventional B-mode constructed using rectangular apodization and NSI mitigated the CNR reduction with a tradeoff of loss in lateral resolution improvements associated with NSI. These images are shown in FIGS. 12I-12K. With the same loss in lateral resolution as with the anechoic targets, the CNR of the hyperchoic target increased from 0.27 dB to 0.72 dB.

The robustness of NSI in the presence of noise was also evaluated. The SNR of NSI was actually observed to increase over rectangular apodization. Improvements in SNR of 16 dB were observed with NSI after beam forming. These increases in SNR are attributable to the process of image formation using NSI where highly correlated signals are subtracted from one another. The subtraction results in a cancellation of much of the noise present in the signals. For additive white Gaussian noise applied to the pre-beamformed data, noise distorted the shape of the mainlobe but did not significantly impact the overall −6 dB beamwidth. An observation that was made is as SNR decreases in the pre-beamformed data, targets and sidelobes will more easily become indistinguishable from the noise as depth increases. This was observed when the pre-beamformed SNR=10. The wire target located at 3 cm depth disappeared in the noise for all imaging schemes.

Figure 13:
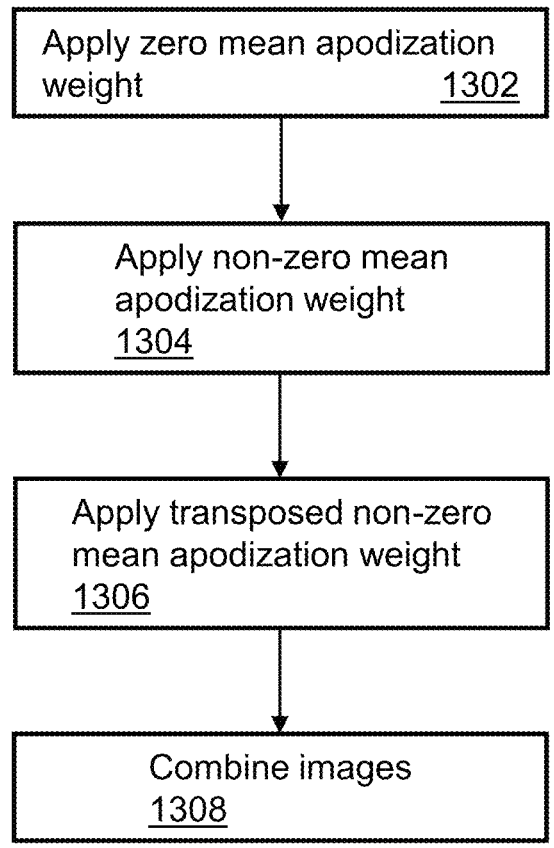
FIG. 13 depicts an illustrative embodiment of a method used in portions of the system described in FIG. 1.

FIG. 13 depicts an illustrative embodiment of a method used by system 100 for generating ultrasound images. At 1302, a first apodization weight can be utilized for ultrasound echoes to generate a first image. The first apodization weight can have a zero mean value across an aperture of the transducer array.

At 1304, a second apodization weight can be utilized for the ultrasound echoes to generate a second image. The second apodization weight can have a non-zero mean value across the aperture of the transducer array. At 1306, a third image can be generated based on a transposition of the second apodization weight. At 1308, the first and third images can be combined to generate a null subtracted image of a target.

In one embodiment, the null subtracted image can be presented at a display device. In one embodiment, the combining of the first, second, and third images comprises subtracting the first image from the sum of the second and third images. In one embodiment, the subtracting of the first image from the sum of the second and third images includes beamforming, envelope detection and/or normalizing the first, second and/or third images. In one embodiment, the generating of the third image comprises: performing beamforming and/or envelope detection on the second image and/or the transposed second image to generate an adjusted second image and an adjusted transposed second image; and combining the adjusted second image and the adjusted transposed second image. In one embodiment, reconstruction of the first image, the second image, the third image, or a combination thereof can be based on f-k migration using an exploding reflector model. In one embodiment, a DC bias can be determined or selected according to sidelobe levels and mainlobe width, where the second apodization weight includes the DC bias.

While for purposes of simplicity of explanation, the respective processes are shown and described as a series of blocks in FIG. 13, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Upon reviewing the aforementioned embodiments, it would be evident to an artisan with ordinary skill in the art that said embodiments can be modified, reduced, or enhanced without departing from the scope of the claims described below. For example, other imaging techniques can be added to the apodization weighting techniques described herein to further reduce image distortion. The ultrasonic waves can include plane waves, as well as other types of waves. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 14:
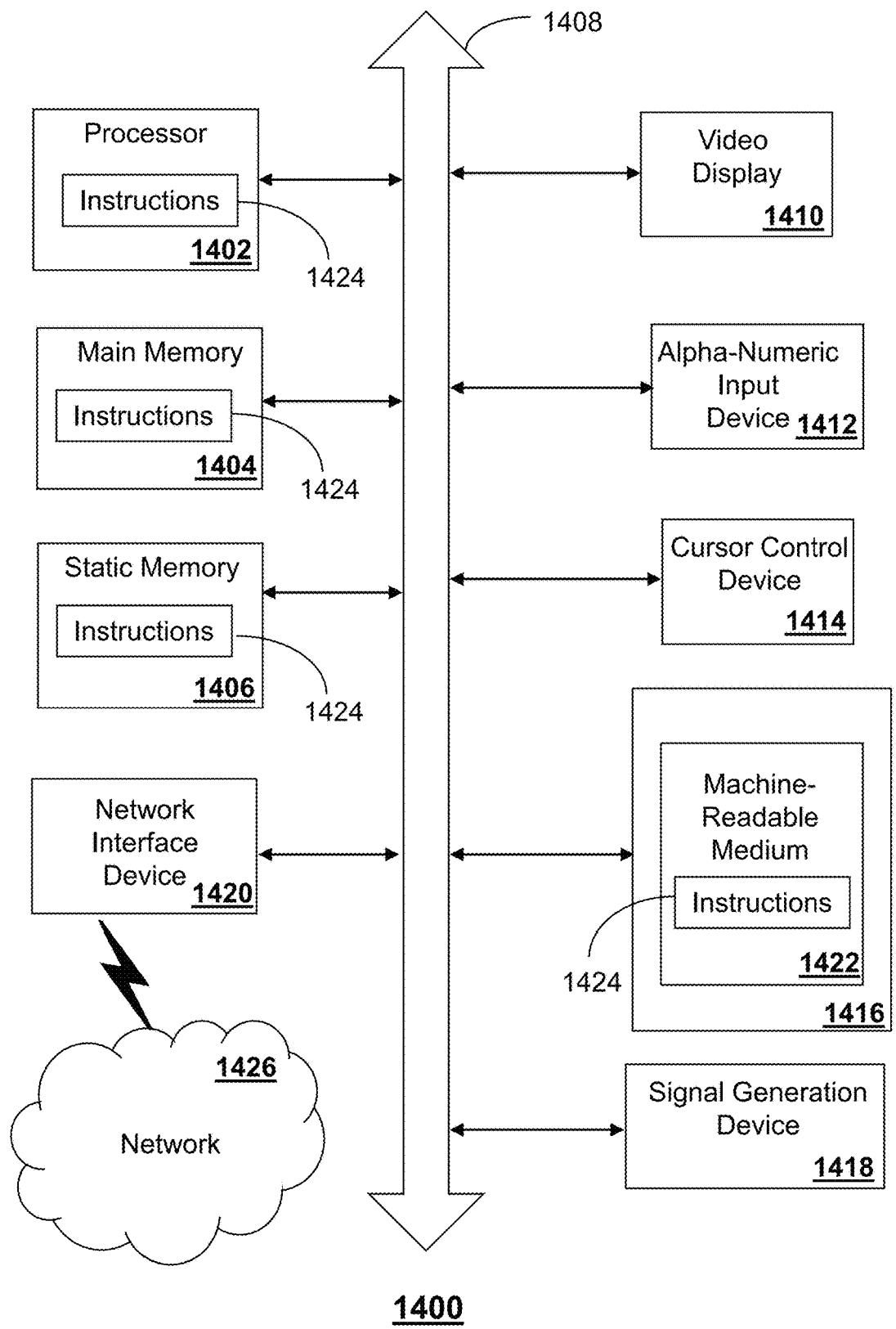
FIG. 14 is a diagrammatic representation of a machine in the form of a computer system within which a set of instructions, when executed, may cause the machine to perform any one or more of the methods described herein.

FIG. 14 depicts an exemplary diagrammatic representation of a machine in the form of a computer system 1400 within which a set of instructions, when executed, may cause the machine to perform any one or more of the methods described above. One or more instances of the machine can operate, for example, as the processor 25, transducer 50 and/or display 75 for providing ultrasound imaging via null subtraction imaging techniques. In some embodiments, the machine may be connected (e.g., using a network 1426) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor (or controller) 1402 (e.g., a central processing unit (CPU)), a graphics processing unit (GPU, or both), a main memory 1404 and a static memory 1406, which communicate with each other via a bus 1408. The computer system 1400 may further include a display unit 1410 (e.g., a liquid crystal display (LCD), a flat panel, or a solid state display). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420. In distributed environments, the embodiments described in the subject disclosure can be adapted to utilize multiple display units 1410 controlled by two or more computer systems 1400. In this configuration, presentations described by the subject disclosure may in part be shown in a first of the display units 1410, while the remaining portion is presented in a second of the display units 1410.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1400. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    emitting, by a system including a processor, ultrasonic waves from a transducer array directed to a target;
    receiving, by the system at the transducer array, ultrasound echoes;
    applying, by the system, a first apodization weight for the ultrasound echoes to generate a first image, the first apodization weight having a zero mean value across an aperture of the transducer array;
    applying, by the system, a second apodization weight for the ultrasound echoes to generate a second image, the second apodization weight having a non-zero mean value across the aperture of the transducer array;
    generating, by the system, a third image based on a transposed second image that is generated by transposing the second apodization weight; and
    combining, by the system, the first, second and third images to generate a null subtracted image of the target.

2. The method of claim 1, further comprising presenting the null subtracted image at a display device.

3. The method of claim 1, wherein the combining of the first, second and third images comprises subtracting the first image from a sum of the second and third images.

4. The method of claim 3, wherein the subtracting of the first image from a sum of the second and third images includes beamforming, envelope detection and normalizing the first, second and third images.

5. The method of claim 1, further comprising performing beamforming, envelope detection and normalizing on at least one of the first, second or third images.

6. The method of claim 1, wherein reconstruction of the first image, the second image, the third image, or a combination thereof is based on f-k migration using an exploding reflector model.

7. The method of claim 1, further comprising:
    determining, by the system, a DC bias according to sidelobe levels and mainlobe width, wherein the second apodization weight includes the DC bias.

8. A device, comprising:
    a processing system including a processor; and
    a memory that stores executable instructions that, when executed by the processing system, facilitate performance of operations, the operations comprising:
        applying a first apodization weight for ultrasound echoes to generate a first image, the first apodization weight having a zero mean value across an aperture of a transducer array;
        applying a second apodization weight for the ultrasound echoes to generate a second image, the second apodization weight having a non-zero mean value across the aperture of the transducer array;
        generating a third image based on a transposed second image that is generated by transposing the second apodization weight; and
        combining the first, second and third images to generate a null subtracted image of a target.

9. The device of claim 8, wherein the operations further comprise:
    emitting ultrasonic waves from the transducer array directed to a target; and
    receiving, at the transducer array, the ultrasound echoes.

10. The device of claim 8, wherein the operations further comprise presenting the null subtracted image at a display device.

11. The device of claim 8, wherein the operations further comprise performing beamforming, envelope detection and normalizing on at least one of the first, second or third images.

12. The device of claim 8, wherein the combining of the first, second and third images comprises subtracting the first image from a sum of the second and third images.

13. The device of claim 12, wherein the subtracting of the first image from a sum of the second and third images includes beamforming, envelope detection and normalizing the first, second and third images.

14. The device of claim 8, wherein reconstruction of the first image, the second image, the third image, or a combination thereof is based on f-k migration using an exploding reflector model.

15. The device of claim 8, wherein the operations further comprise:
  determining a DC bias according to sidelobe levels and mainlobe width, wherein the second apodization weight includes the DC bias.

16. A machine-readable storage medium, comprising executable instructions that, when executed by a processing system including a processor, facilitate performance of operations, comprising:

applying different apodization weights for ultrasound echoes to generate a plurality of images of a target, wherein one of the different apodization weights has a zero mean value across an aperture of a transducer array, wherein one image of the plurality of images includes a transposition of the one of the different apodization weights having the zero mean value across the aperture of the transducer array; and generating a null subtracted image of the target by combining the plurality of images, wherein another one of the different apodization weights has a non-zero mean value across the aperture.

17. The machine-readable storage medium of claim 16, wherein the combining of the plurality of images comprises beamforming, envelope detection and normalizing of the plurality of images.

18. The machine-readable storage medium of claim 16, wherein the operations further comprise emitting ultrasonic waves from the transducer array directed to the target.

19. The machine-readable storage medium of claim 16, wherein the operations further comprise determining a DC bias according to sidelobe levels and mainlobe width, wherein the DC bias is added to the one of the different apodization weights having the zero mean value across the aperture of the transducer array.

20. The machine-readable storage medium of claim 16, wherein the operations further comprise providing the null subtracted image for presentation at a display device.

* * * * *